(12) United States Patent
Utagawa

(10) Patent No.: US 7,599,578 B2
(45) Date of Patent: Oct. 6, 2009

(54) APPARATUS, PROGRAM, AND METHOD FOR IMAGE TONE TRANSFORMATION, AND ELECTRONIC CAMERA

(75) Inventor: Ken Utagawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 476 days.

(21) Appl. No.: 11/224,926

(22) Filed: Sep. 14, 2005

(65) Prior Publication Data

US 2006/0062562 A1 Mar. 23, 2006

(30) Foreign Application Priority Data

| Sep. 17, 2004 | (JP) | ............................ 2004-272562 |
| Sep. 17, 2004 | (JP) | ............................ 2004-272596 |
| Mar. 29, 2005 | (JP) | ............................ 2005-095625 |
| Mar. 29, 2005 | (JP) | ............................ 2005-095630 |

(51) Int. Cl.
*G06K 9/36* (2006.01)
*G06K 9/00* (2006.01)
(52) U.S. Cl. ...................................... 382/276; 382/167
(58) Field of Classification Search ................. 382/167, 382/162, 166, 276, 274, 309; 348/223.1, 348/649–652, 222.1, 256, 251, 254; 358/461, 358/518, 448, 1.9; 345/591, 632, 600, 604, 345/606, 589; 396/213
See application file for complete search history.

(56) References Cited

U.S. PATENT DOCUMENTS

| 5,296,920 | A | | 3/1994 | Sakaue et al. |
| 5,661,575 | A | | 8/1997 | Yamashita et al. |
| 5,991,456 | A | | 11/1999 | Rahman et al. |
| 6,101,271 | A | | 8/2000 | Yamashita et al. |
| 7,142,710 | B2 | * | 11/2006 | Hung .......................... 382/162 |
| 7,181,091 | B2 | * | 2/2007 | Yoda .......................... 382/309 |
| 7,215,366 | B2 | * | 5/2007 | Mori et al. ................ 348/223.1 |
| 7,251,057 | B2 | * | 7/2007 | Tsujino et al. ................ 358/1.9 |
| 2003/0026494 | A1 | | 2/2003 | Woodell et al. |
| 2003/0156761 | A1 | | 8/2003 | Ogata et al. |
| 2004/0091164 | A1 | | 5/2004 | Sakatani et al. |

FOREIGN PATENT DOCUMENTS

| EP | 0 533 100 A2 | 3/1993 |
| JP | A 4-150171 | 5/1992 |
| JP | A 2003-8935 | 1/2003 |
| WO | WO 03/094112 A2 | 11/2003 |

* cited by examiner

*Primary Examiner*—Yon Couso
(74) *Attorney, Agent, or Firm*—Oliff & Berridge, PLC

(57) ABSTRACT

A tone transformation apparatus of the present invention extracts or generates a signal Z[i, j] according to a pixel value of a pixel [i. j] of an original image or a pixel value of its immediate neighborhood. Further, it extracts or generates a signal ZL[i, j] according to a pixel value of a neighborhood area of the pixel [i, j]. A transformation gain k for the pixel [i. j] is determined according to these signals Z, ZL. For the tone transformation, a color component or the like of the pixel [i, j] is multiplied by the transformation gain k for the pixel [i. j].

15 Claims, 14 Drawing Sheets

FIG. 3
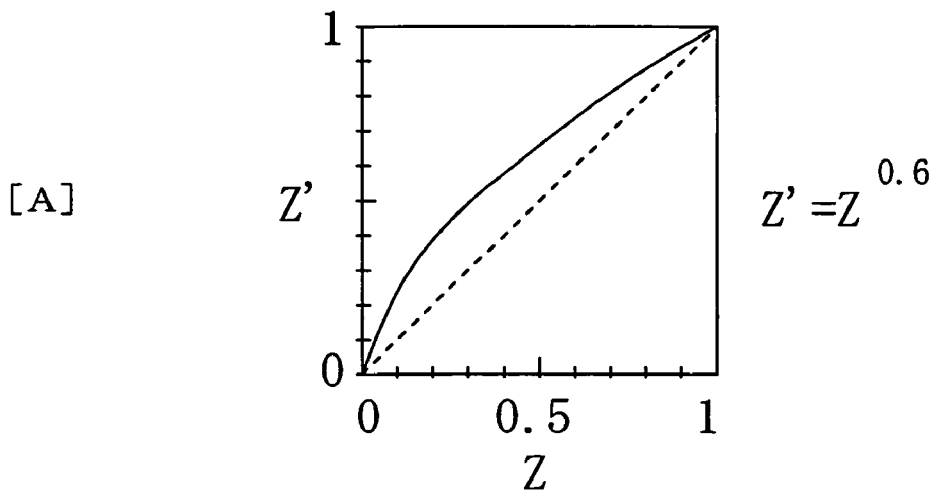
[A]     $Z' = Z^{0.6}$
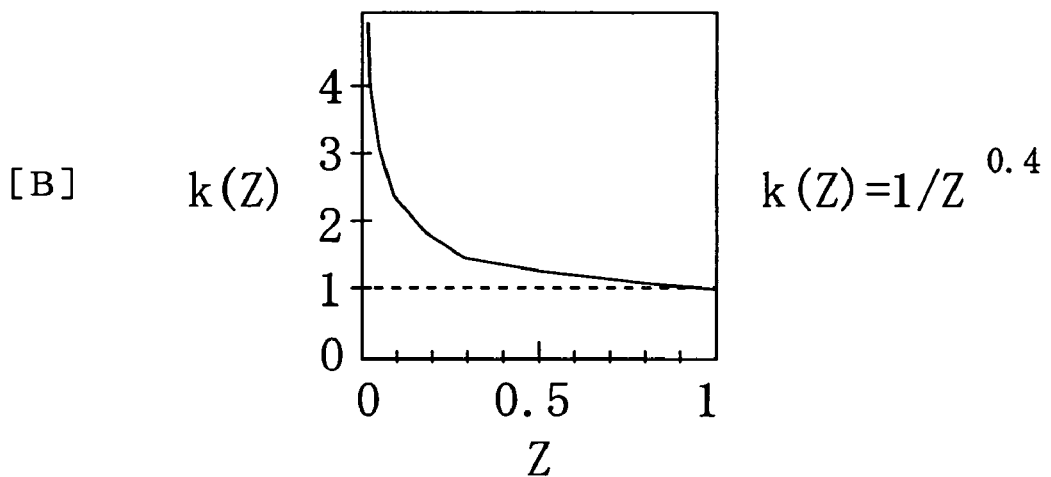
[B]     $k(Z) = 1/Z^{0.4}$
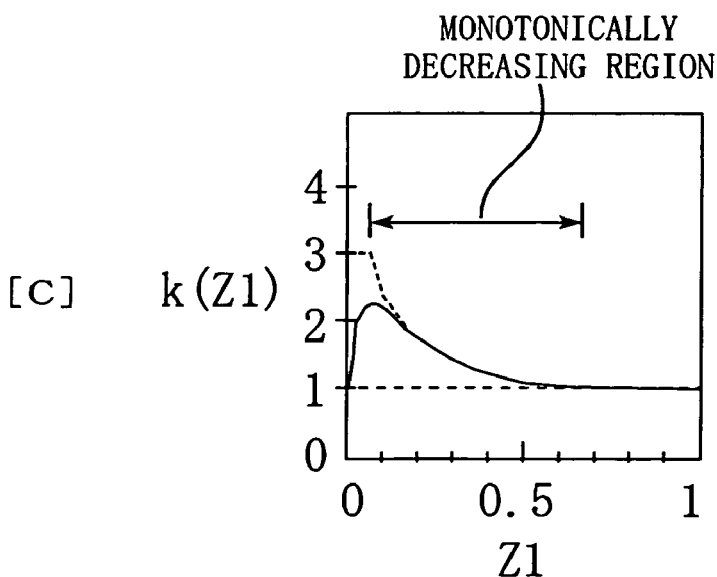
[C]

EXAMPLES OF TONE TRANSFORMATION GAIN

APPARATUS, PROGRAM, AND METHOD FOR IMAGE TONE TRANSFORMATION, AND ELECTRONIC CAMERA

CROSS REFERENCE TO RELATED APPLICATION

This application is based upon and claims the benefit of priority from Japanese Patent Application Nos. 2004-272562 and 2004-272596, both filed on Sep. 17, 2004, and Nos. 2005-095625 and 2005-095630, both filed on Mar. 29, 2005, the entire contents of which are incorporated herein by reference.

BACKGROUND OF THE INVENTION

1. Field of the Invention

The present invention relates to an apparatus a program, and a method for image tone transformation, and an electronic camera.

2. Description of the Related Art (Prior Art 1)

Japanese Unexamined Patent Application Publication No. Hei 4-150171 (hereinafter, referred to as Patent document 1) describes a conventional tone transformation technique.

According to this prior art, a luminance signal Y is calculated by the following equation:

$$Y = 0.3 \cdot R + 0.59 \cdot G + 0.11 \cdot B \qquad [1]$$

Next, predetermined tone transformation $Y' = f(Y)$ is applied to the luminance signal Y to find a luminance signal Y' after the transformation. This tone transformation uses a gamma transformation characteristic $f(Y) = Y^\gamma$, an arbitrary nonlinear function, or the like. A ratio of the luminance signals before and after the transformation is calculated as a transformation gain $k(Y)$.

Each of RGB color components of an image is multiplied by the transformation gain $k(Y)$, to calculate the following equation and find by color components R', G', B' after the transformation.

$$R' = k(Y) \cdot R$$

$$G' = k(Y) \cdot G$$

$$B' = k(Y) \cdot B \qquad [2]$$

The prior art in Patent document 1 is suitable for adjusting the general brightness/darkness balance of the whole image. However, this prior art cannot realize image processing such as particularly emphasizing the tone of a detailed portion so as to attain an image with a higher contrast and a more detailed expression.

(Prior Art 2)

Another known tone correction method is a Retinex method. The Retinex method can emphasize a minute variance in the tone to retrieve the tone hidden in a dark portion or the like.

With the Retinex method, it has been difficult to perform delicate processing such as adjusting the rise of the tone of a detailed portion while adjusting the general brightness/darkness balance of the whole image.

(Prior Art 3)

Japanese Unexamined Patent Application Publication No. 2003-008935 (hereinafter, referred to as Patent document 2) discloses a method of compressing a dynamic range by the following equation.

$$O[i,j] = I[i,j] \times F(R[i,j]) \qquad [100],$$

where

I[i, j] is a pixel value of an input image, O[i, j] is a pixel value of an output image, F( ) is a coefficient calculation function, and R[i, j] is a pixel value of the input image after it goes through an Epsilon filter. The Epsilon filter is a nonlinear filter for nonlinearly extracting a small amplitude component from the input image to subtract the small amplitude component from the input image.

However, the processing as expressed by the equation [100] has sometimes resulted in excessively exaggerating shadows. There has been a problem that, when an image including a person is subjected to the strong gamma correction, the exaggeration of shadows increases, which causes unnatural finish of the image of the person and a conspicuous unnatural impression, compared with a case where linear image processing is applied to brightness of a subject.

The processing with the Epsilon filter has another problem that it is complicated and takes a lot of time. On the other hand, the use of a simple low pass filter instead of the Epsilon filter has a problem of causing a halo in a portion having a great luminance difference.

Moreover, the aforesaid Patent document 2 discloses a case where the input image has only 1 component, that is, I[i, j]. In this case it is difficult to obtain a favorable result for respective color components of an image such as a color image having a plurality of components even if the processing as expressed by the following equations is applied thereto.

$$O1[i,j] = I1[i,j] \times F(R1[i,j]) \qquad [101]$$

$$O2[i,j] = I2[i,j] \times F(R2[i,j]) \qquad [102]$$

$$O3[i,j] = I3[i,j] \times F(R3[i,j]) \qquad [103]$$

SUMMARY OF THE INVENTION

Therefore, it is an object of the present invention to provide a tone transformation technique enabling well-balanced adjustment of the brightness/darkness balance and of the rise of the tone in a detailed portion.

Hereinafter, the present invention will be described.

A tone transformation apparatus of the present invention is for transforming a tone of an original image, and includes a signal obtaining unit, a neighborhood processing unit, a gain generator, and a tone transformation unit.

The signal obtaining unit extracts or generates a first signal Z[i, j] that changes according to a pixel value of a pixel [i, j] of the original image or to a pixel value of an immediate neighborhood of the pixel [i, j].

The neighborhood processing unit extracts or generates a second signal ZL[i, j] that changes according to a pixel value of a neighborhood area of the pixel [i, j]. The neighborhood area is larger than the immediate neighborhood.

The gain generator determines a transformation gain k for the pixel [i, j] according to the first signal Z[i, j] and the second signal ZL[i, j].

The tone transformation unit performs tone transformation by multiplying, by the transformation gain k for the pixel [i, j], a color component of the pixel [i, j] or a signal component generated from the color component.

Preferably, the gain generator generates a composite signal Z1(Z, ZL) of the first signal Z[i, j] and the second signal ZL[i, j]. The gain generator determines the transformation gain k for the pixel [i, j] by substituting the composite signal Z1 (Z, ZL) in a function $k = k(Z1)$ of a predetermined gain curve.

Preferably, the function of the predetermined gain curve differs in determining a gain by which an achromatic signal is multiplied and determining a gain by which a chromaticity signal such as a color difference is multiplied.

Preferably, the first signal Z[i, j] or the second signal ZL[i, j] is a signal reflecting brightness (such as luminance or lightness).

Preferably, the first signal Z[i, j] or the second signal ZL[i, j] is a signal reflecting brightness (such as luminance or lightness) and a color difference and whose value increases as the color difference increases even with a same brightness.

Preferably, the signal reflecting brightness (such as luminance or lightness) and a color difference is expressed as $$Y+w1 \cdot |Cr|+w2 \cdot |Cb|, \text{ where}$$

Y is a signal dependent on the brightness, |Cr| and |Cb| are signals reflecting the color difference, and w1 and w2 are constants.

Preferably, the gain generator defines, as the composite signal Z1, a value resulting from weighted composition of the first signal Z[i, j] and the second signal ZL[i, j], or a value resulting from weighted composition of the weighed composition value and higher terms of the first signal Z[i, j] and the second signal ZL[i, j]. The gain generator determines the transformation gain k for the pixel [i, j] based on the function k=k(Z1) of the predetermined gain curve.

Preferably, the gain generator executes the following procedures:

(1) to obtain signals X, XL by an arithmetic operation of finding reciprocals of the signals Z, ZL;
(2) to generate a composite signal X1 by composing the signals X, XL; and
(3) to find the transformation gain k according to the composite signal X1.

Preferably, the gain generator includes a first gain generating part, a second gain generating part, and a gain composing part.

The first gain generating part generates a transformation gain kz according to the first signal Z[i, j].

The second gain generating part generates a transformation gain ks according to a ratio of the first signal Z[i, j] and the second signal ZL[i, j].

The gain composing part generates the transformation gain k according to a product of the transformation gains kz, ks.

Preferably, the first signal Z[i, j] and the second signal ZL[i, j] are signals reflecting brightness (such as luminance or lightness).

Preferably, the first signal Z[i, j] and the second signal ZL[i, j] are signals reflecting brightness (such as luminance or lightness) and a color difference and whose values increase as the color difference increases even with a same brightness.

Preferably, the first signal Z[i, j] is a signal reflecting brightness (such as luminance or lightness) and a color difference while the second signal ZL[i, j] is a signal reflecting brightness (such as luminance or lightness). The gain generator includes a first gain generating part, a second gain generating part, and a gain composing part.

The first gain generating part generates a transformation gain kz according to the first signal Z[i, j].

The second gain generator generates a transformation gain ks according to a ratio of a signal Y[i, j] and the second signal ZL[i, j]. The signal Y[i, j] indicates luminance or lightness of the pixel [i, j] of the original image or of the immediate neighborhood of the pixel [i, j].

The gain composing part generates the transformation gain k according to a product of the transformation gains kz, ks.

Preferably, the first signal Z[i, j] is a signal Y[i, j] reflecting brightness (such as luminance or lightness). The second signal ZL[i, j] is a signal VL[i, j] which is more dependent on the color difference than on the signal Y.

Preferably, the neighborhood processing unit extracts or generates the second signal ZL[i, j] that changes according to a signal V of the neighborhood area of the pixel [i, j], where V is calculated from YCbCr values and expressed as $V=Y+w1 \cdot |Cb|+w2 \cdot |Cr|$, or calculated from RGB values and expressed as $V=\max(R, G, B)$.

Preferably, the gain generator generates the composite signal Z1(Z, ZL) of the first signal Z[i, j] and the second signal ZL[i, j] by an equation $Z1=(1-\alpha) \cdot Y+\alpha \cdot V (0<\alpha<1)$.

Preferably, the neighborhood processing unit reduces the original image to generate a reduced image and extracts or generates from the reduced image the second signal ZL[i, j] that changes according to the pixel value of the neighborhood area.

Preferably, a reduction ratio of the reduced image is ⅛ or lower.

Preferably, the neighborhood processing unit executes predetermined filtering in a process of reducing the original image.

Preferably, the neighborhood processing unit finds a signal V indicating representative points of every M pixels ($M \geq 2$) of the original image to generate the reduced image. The neighborhood processing unit variably magnifies the reduced image M-fold to generate the second signal ZL[i, j] of a size of the original image.

A tone transformation program of the present invention includes program codes to cause a computer to function as the signal obtaining unit, the neighborhood processing unit, the gain generator, and the tone transformation unit according to [1] described above.

An electronic camera of the present invention includes: the tone transformation apparatus according to [1] described above; and an image-capturing unit capturing an image of a subject to generate an original image. This electronic camera has a function of transforming a tone of the original image generated by the image-capturing unit by using the tone transformation apparatus.

A tone transformation method of the present invention is for transforming a tone of an original image and it includes the following steps:

Step 1) extracting or generating a first signal Z[i, j] that changes according to a pixel value of a pixel [i, j] of the original image or to a pixel value of an immediate neighborhood of the pixel [i, i];

(Step 2) extracting or generating a second signal ZL[i, j] that changes according to a pixel value of a neighborhood area of the pixel [i, j], the neighborhood area being larger than the immediate neighborhood;

(Step 3) determining a transformation gain k for the pixel [i, j] according to the first signal Z[i, j] and the second signal ZL[i, j]; and (Step 4) performing tone transformation by multiplying, by the transformation gain k for the pixel [i, j], a color component of the pixel [i, j] or a signal component generated from the color component.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 3[A] to FIG. 3[C] are charts showing examples of a tone transformation characteristic;

DETAILED DESCRIPTION OF THE PREFERRED EMBODIMENTS

Hereinafter, embodiments of the present invention will be described in detail with reference to the drawings.

First Embodiment

<<Description of Configuration>>

Figure 1:
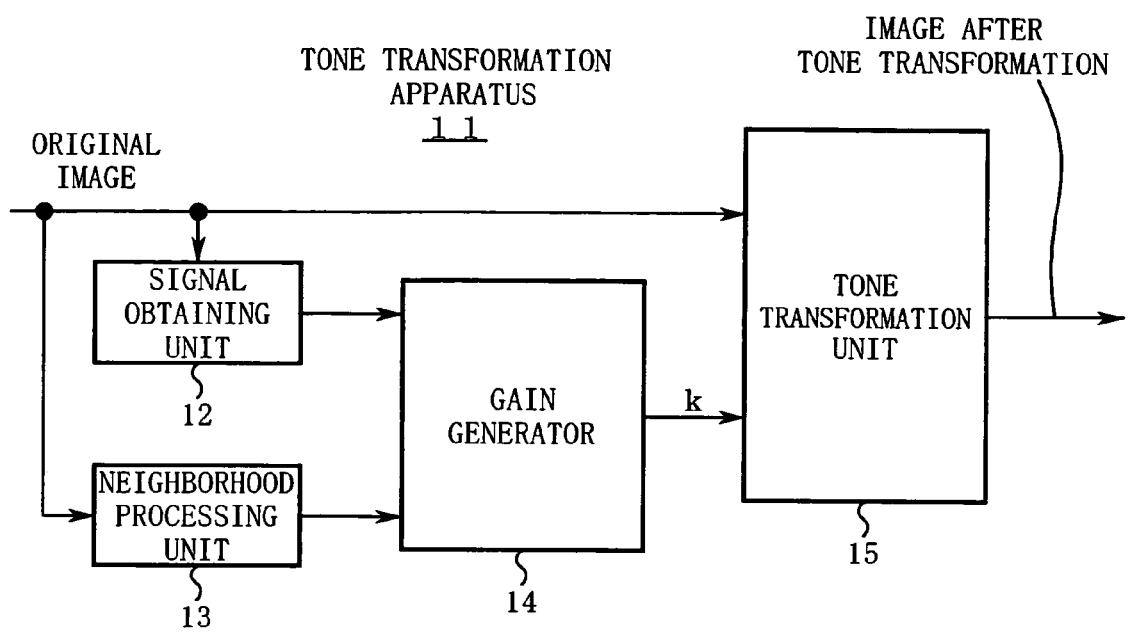
FIG. 1 is a block diagram showing a configuration of a tone transformation apparatus.

FIG. 1 is a diagram showing a configuration of a tone transformation apparatus 11.

In FIG. 1, the tone transformation apparatus 11 includes the following constituent features:

(1) a signal obtaining unit 12 to obtain a signal Z indicating brightness or the like of each pixel of an original image.

(2) a neighborhood processing unit 13 to extract a neighborhood area from each pixel of the original image and processes pixels in the neighborhood area to obtain a signal ZL.

(3) a gain generator 14 to find a transformation gain k for each pixel according to the signal Z and the signal ZL.

(4) a tone transformation unit 15 to transform the tone by multiplying a signal of each pixel of the original image by the transformation gain k for each pixel.

The above-described tone transformation apparatus 11 may be partly or entirely composed of hardware. Alternatively, the tone transformation apparatus 11 may be realized on a computer as software by the use of a tone transformation program.

Figure 2:
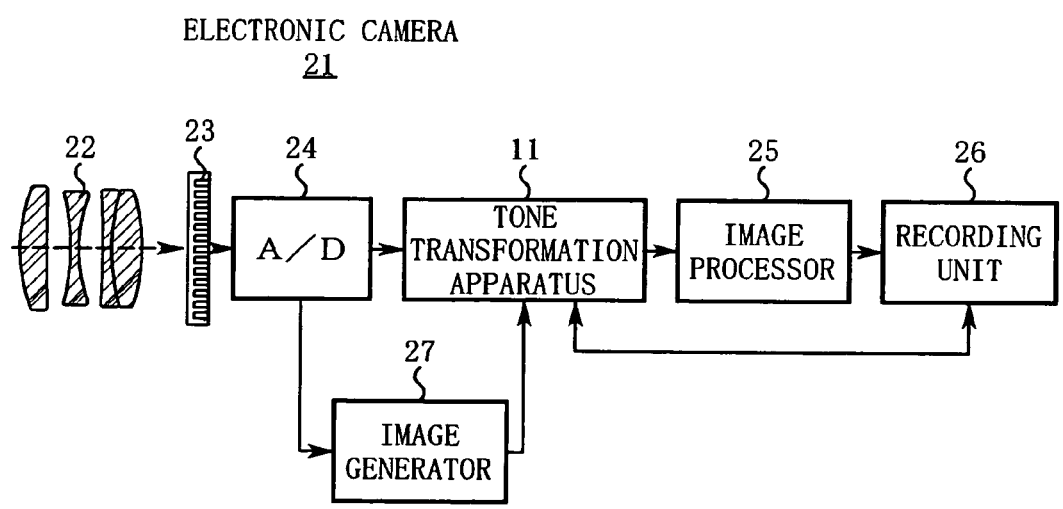
FIG. 2 is a block diagram showing a configuration of an electronic camera.

FIG. 2 is a diagram showing an electronic camera 21 including the tone transformation apparatus 11 as described above.

In FIG. 2, an image-capturing lens 22 is attached to the electronic camera 21. An image-capturing surface of an image sensor 23 is disposed on an image space side of the image-capturing lens 22 via an aperture and a shutter which are not shown. An image signal outputted from the image sensor 23 is inputted to the tone transformation apparatus 11 as the original image via an A/D converter 24 and so on. The tone transformation apparatus 11 applies the tone transformation to the original image. The image signal outputted from the tone transformation apparatus 11 is subjected to image processing through an image processor 25 and then recorded in a recording unit 26.

The tone transformation apparatus 11 can also read recorded image data from the recording unit 26 for tone transformation at a later time.

An image generator 27 may be provided between the A/D converter 24 and the tone transformation apparatus 11. The image generator 27 transforms an output of the A/D converter 24 into an original image of a luminance/color difference signal (YCbCr or the like) to give it to the tone transformation apparatus 11. In a case where the image sensor 23 is a single-plate image sensor with a Bayer pattern or the like, the image generator 27 interpolates the output of the A/D converter 24 to output the luminance/color difference signal (YCbCr or the like).

<<Explanation of Principle of First Embodiment>>

First, the principle of features of the first embodiment will be described.

In the first embodiment, a tone transformation characteristic (curve) as a reference is set in advance. For example, for correcting an image captured against light, the tone transformation as shown in FIG. 3[A] is applied so that the tone of a dark portion is changed to a brighter side. This tone transformation is expressed by the following equation:

$$Z' = Z^q \quad [9]$$

(for example, q=0.6), where Z and Z' are signals before and after the tone transformation.

The transformation gain k in this case is $$k(Z) = Z'/Z = 1/(Z^p) \quad [10],$$

where, p=1−q.

FIG. 3[B] is a chart showing a relation between the signal Z and the transformation gain k.

The transformation gain k with a nonlinear tone transformation characteristic thus changes depending on a value of the signal Z before the transformation.

Next, in the first embodiment, a signal indicating brightness or the like of pixels in a neighborhood area of a pixel [l, j] is found and defined as ZL. For example, the signal ZL may have an average value of values indicating the brightness of the neighboring pixels, or the signal ZL may be determined in such a manner that a predetermined space frequency component (for example, a predetermined subband component, a predetermined low-band component, or the like) indicating brightness of the image is extracted to adapt a value of the pixel [i, j] of this extracted image as the signal ZL.

From the magnitude relation of such signals Z, ZL, it is possible to know how the tone in a detailed portion of the image rises, that is, how the signal Z indicating the pixel [i, j] changes from the signal ZL indicating the neighborhood.

In the first embodiment, depending on the magnitude relation of the signals Z, ZL, the transformation gain k is increased/decreased for adjustment. As a result, it is possible to adaptively emphasize the rise of the tone of the detailed portion or conversely, or to adaptively suppress it.

Such adaptive incremental/decremental adjustment of the transformation gain k is realized by, for example, replacing the transformation gain k(Z), which is dependent only on the signal Z, by a transformation gain k(Z1) dependent on a composite signal Z1=(Z+ZL)/2 or the like.

Here, the adaptive incremental/decremental adjustment of the transformation gain k will be described in two different cases, namely, in a monotonically decreasing region of k( ) and a monotonically increasing region of k( ). First, in the monotonically decreasing region of k( ), the transformation gain k(Z1) presents the following increasing/decreasing change with respect to the original transformation gain k(Z).
(1) If Z=ZL, then Z1=Z, and therefore, k(Z1)=k(Z).
(2) If Z<ZL, then Z1>Z, and therefore, k(Z1)<k(Z).
(3) If Z>ZL, then Z1<Z, and therefore, k(Z1)>k(Z).

The above-described case (1) corresponds to a place where a tone change in the detailed portion is small. In such a place, k(Z1) is equal to the original k(Z). Therefore, the general tone transformation characteristic affecting the whole image is substantially equal to a preset tone transformation characteristic. Therefore, it is possible to avoid an adverse effect such as a situation that a dark portion of the image becomes too bright and conspicuous.

On the other hand, the above-described cases (2) and (3) correspond to places where the tone of a detailed portion has changed. In these places, k(Z1) makes an incremental/decremental change so as to increase the contrast between the neighborhood area (signal ZL) and the signal Z. Because of this reason, in the monotonically decreasing region of k( ), the rise of the tone in the detailed portion is adaptively emphasized.

On the other hand, in the monotonically increasing region of k( ), k(Z1) presents an incremental/decremental change contrary to the above, so that it is possible to adaptively suppress the rise of the tone of the detailed portion.

Note that setting k( ) by a LUT (lookup table or the like) facilitates appropriately allocating an input region of Z1 to the monotonically decreasing region and the monotonically increasing region. For example, as shown in FIG. 3[C], an intermediate region excluding regions near 0 and near the upper limit of Z1 can be allocated as the monotonically decreasing region. In such design, it is possible to adaptively emphasize the rise of the tone of the detailed portion in the intermediate region where a visual effect is high.

Further, in the description above, the incremental/decremental adjustment of the transformation gain is realized by changing an argument of the transformation gain k( ) from Z to Z1. However, the adaptive incremental/decremental adjustment of the transformation gain k may be realized by changing the argument of the transformation gain k( ) from Z to multi-arguments (Z, ZL). In this case, it is preferable that the increase of the signal Z decreases the gain k and the increase of the signal ZL decreases the gain k. Such processing makes it possible to emphasize the tone of a dark image area while suppressing signal saturation after the tone transformation.

As the aforesaid signal Z, a signal indicating luminance or lightness or a signal reflecting brightness and a color difference and having a larger value as the color difference is higher even with the same brightness may be used. In particular, the use of the signal Z reflecting brightness and a color difference makes it possible to suppress color saturation after the tone transformation to a moderate degree.

Another possible method is to find signals X, XL corresponding to reciprocals of the signals Z, ZL and compose these signals X, XL, thereby generating a composite signal X1. In the above equation [10], the tone transformation gain k is obtained by subjecting a reciprocal value of the signal Z to nonlinear processing such as exponentiation. Here, it is possible to design a desired gain curve by appropriately subjecting the composite signal X1 corresponding to the reciprocal to processing h(such as gain limiter, exponentiation, gain decrease in the vicinity of 0, or approximation of the gain to 1 when Z has a larger value than a predetermined value. In this case, since the composite signal X1 presents an incremental/decremental change depending on the magnitude relation of the signals Z, ZL, the transformation gain k=h(X1) obtained by processing the composite signal X1 naturally presents an incremental/decremental change. As a result, it is possible to adjust the rise of the tone of the detailed portion by multiplying the image by the transformation gain k.

Instead of the signals Z, ZL, X, XL, signals obtained by subjecting the signals Z, ZL, X, XL to nonlinear processing such as exponentiation or normalization may be used. Further, a method of obtaining the composite signals Z1, X1 is not limited to weighted addition of the original signals. For example, higher terms of the original signals may be added to the calculation equations of the composite signals Z1, X1. Such variation allows further subtle setting of the incremental/decremental adjustment of the transformation gain k.

Further, the tone transformation is sometimes accompanied by a change in saturation in an undesired direction. In this case, correcting saturation according to the transformation gain k that is dependent on the signals Z, ZL makes it possible to take full consideration of an influence of the incremental/decremental adjustment of the transformation gain k into saturation correction.

<<Concrete Example of Tone Transformation>>

Figure 4:
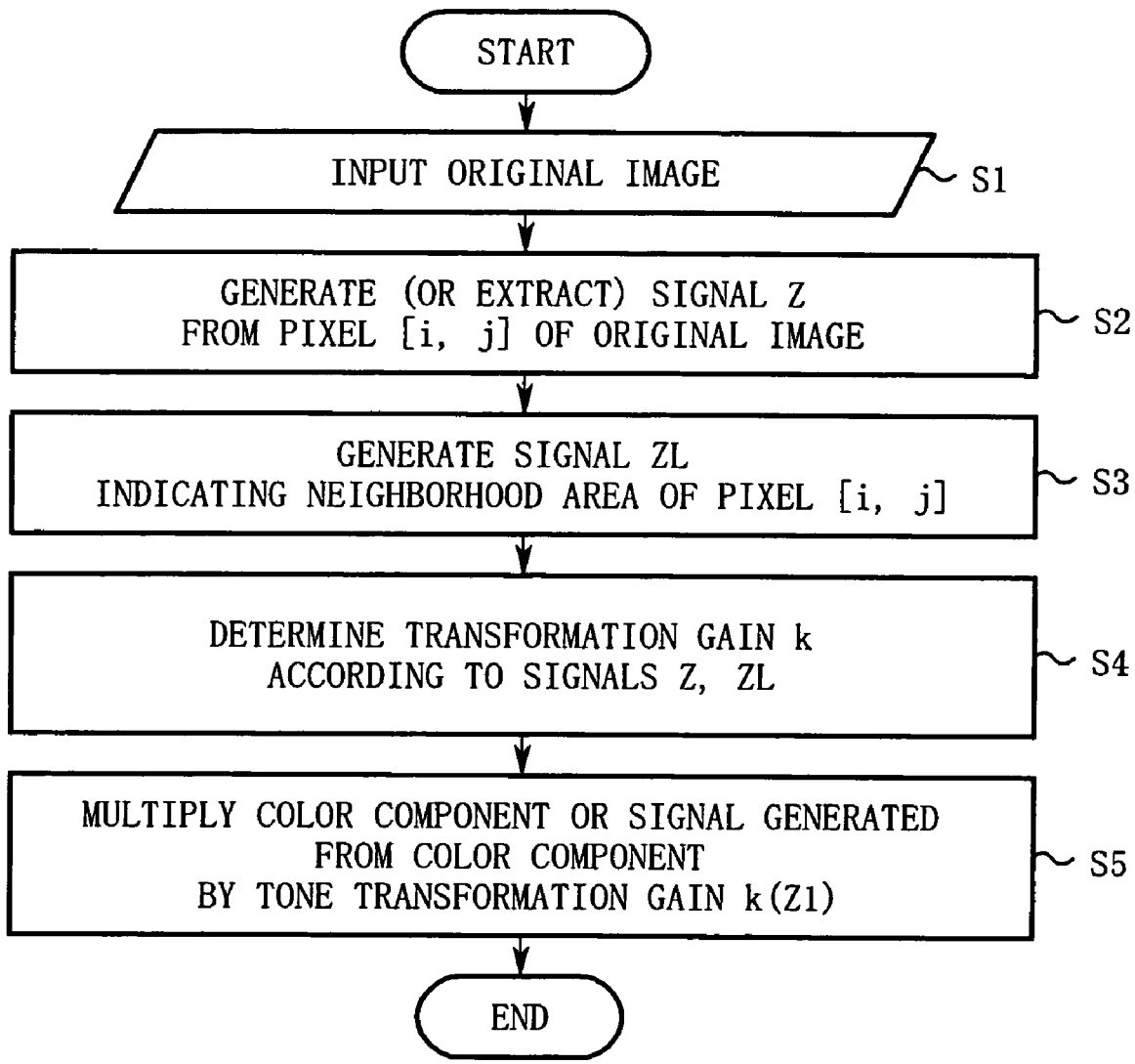
FIG. 4 is a flowchart showing image processing operations in an embodiment.

Next, concrete processing of the tone transformation will be described using FIG. 4.

[Step S1] The tone transformation apparatus 11 takes in the original image. This original image is composed of color components such as (R, G, B), (Y, Cr, Cb), or (L, a, b). Further, in some case, RAW data in which each pixel has missing color components is inputted as the original image.

[Step S2] The signal obtaining unit 12 extracts or generates the signal Z[i, j] for the pixel [i, j] of the original image. Note that [i, j] represents coordinates of the pixel.

As the signal Z, a luminance signal Y (Y=a1·R+a2·G+a3·B) calculated from RGB color components may be adopted. Further, when the original image is expressed in a YCrCb color space, the luminance signal Y can be used as it is. Further, when the original image is expressed in a Lab color space, lightness L can be also used as it is.

However, the tone transformation based on the aforesaid luminance signal Y causes an adverse effect that an area where the saturation of red or blue is high tends to reach a saturated state after the tone transformation. Therefore, it is preferable to adopt, as the signal Z, a signal reflecting not only brightness (such as luminance or lightness) but also a color difference. A preferable signal as such a signal Z is a function to which R contributes much in a place where R is strong, G contributes much in a place where G is strong, and B contributes much in a place where B is strong, in terms of the RGB components. For example, when the original image is a signal of the RGB color space, the signal Z is preferably found by Z=max(R, G, B).

For example, when the original image is a signal of the YCrCb color space or the Lab color space, Z=max(R, G, B) may be found after it is once transformed to RGB. Note that, by composing the signals reflecting brightness (such as luminance or lightness) and a color difference with the use of the following equations [11] or [12], the signal Z that is approximate to max(R, G, B) can be found at high speed with small processing load.

$$Z = Y + w1 \cdot |Cr| + w2 \cdot |Cb| \qquad [11]$$

$$Z = L + w1 \cdot |a| + w2 \cdot |b| \qquad [12]$$

(for example, preferably, $w1 = w2 = \frac{1}{2}$)

The signal Z reflecting both brightness (such as luminance or lightness) and a color difference is a signal presenting a higher value as a color difference is higher and a saturated state is more liable to occur even if brightness is low.

Further, for example, when the original image is RAW data in which each pixel has missing color components, the aforesaid signal Z may be found by using color components in the neighborhood instead of the missing color components of the pixel [i, j]. Alternatively, the aforesaid signal Z may be found after the missing color components of the RAW data is generated by interpolation.

Note that pre-processing, for example, nonlinear processing such as exponentiation, and normalization may be applied to the signal Z.

[Step S3] The neighborhood processing unit 13 obtains the signal ZL[i, j] indicating the neighborhood area of the pixel [i, j]. For example, the signal ZL is found by subjecting an image signal in the neighborhood area (for example, the signal Z, a color signal, a composed value of color signals, a signal reflecting brightness and a color difference, or the like) to smoothing, low-pass filtering, or blurring. As a material used for finding the signal ZL, the signal Z is preferably used as it is, considering a load reduction of the computation.

Concretely, a plurality of image signals positioned in the neighborhood area are defined as the population, and an average value, a weighted average value, a median value, a mode value, an average value of values excluding the minimum and maximum values, an average value of pixel values in the neighborhood within a predetermined range from the signal Z, or the like is found, and the found value is defined as the signal ZL.

Preferably, the signal ZL may be found in such a manner that a pixel whose value is as deviated as possible from the value of the pixel [i, j] is selected from the neighboring pixels around the pixel [i, j] and an image signal of this pixel or a local average value thereof is found. In this case, values of the signals Z, ZL reflect an anisotropic image structure, so that it becomes possible to adjust (emphasize or suppress) the rise of the anisotropic rise of the tone.

Further, for example, when the original image is RAW data in which each pixel has missing color components, the above signal ZL may be found by using color components in the neighborhood instead of the missing color components of the pixel [i, j]. It is also possible to find the above signal ZL after the missing components of the RAW data are generated by interpolation.

As a rough measure of a radius r representing the size of the neighborhood area, an appropriate value in a range roughly from 0.01 to 0.5, for example, 0.05 or the like of a diagonal length of the original image is preferable. Further, the signal ZL may be found by weighted-averaging the signals ZL found for a plurality of radiuses.

This signal ZL may be subjected to pre-processing, for example, nonlinear processing such as exponentiation, and normalization.

[Step S4]

The gain generator 14 determines the transformation gain k for the pixel [i, j] according to the signal Z[i, j] and the signal ZL[i, j]. Hereinafter, variations of a method of determining the transformation gain k will be individually described.

(Determining Method 1)

In the gain generator 14, a correspondence relation of the signals Z, ZL and the transformation gain k is preset by equations or a LUT. In this correspondence relation, when the signal Z increases, the transformation gain k(Z, ZL) decreases, and when the signal ZL increases, the transformation gain k(Z, ZL) decreases. The gain generator 14 determines the corresponding transformation gain k by collating the signals Z, ZL with the correspondence relation.

(Determining Method 2)

First, the gain generator 14 standardizes the signals Z, ZL by using predetermined values Z0, ZL0, and $\gamma$ which are determined for the standardization, and calculates signals S, SL.

$$S = Z/Z0, \text{ or } S = (Z/Z0)^{\wedge}\gamma$$

$$SL = ZL/ZL0, \text{ or } SL = (ZL/ZL0)^{\wedge}\gamma$$

Next, using the signals S, SL, the gain generator 14 calculates the following to generate the composite signal Z1.

$$Z1 = \delta + a1 \cdot S + a2 \cdot SL, \text{ or }$$

$$Z1 = \delta + a1 \cdot S + a2 \cdot SL + a3 \cdot S \cdot SL + a4 \cdot S \cdot S + a5 \cdot SL \cdot SL + \text{(high-order terms of } S \text{ and } SL\text{)}$$

(where the coefficients a1, a2 ... are predetermined constants, and $\delta$ is 0 or a predetermined constant.)

In the gain generator 14, a function k( ) corresponding to the gain curve is preset by an equation or a LUT. For example, a function such as $k(Z1) = x^{\wedge}p$ $(-0.1 > p \geq -1)$ is preferable. The gain generator 14 substitutes the found composite signal Z1 in the function k( ) indicating this gain curve to find the transformation gain k(Z1).

(Determining Method 3)

First, the gain generator 14 standardizes the signals Z, ZL by using the predetermined values Z0, ZL0, $\gamma'$ which are determined for the standardization, and calculates the following reciprocal signals X, XL.

$$X = Z0/(Z+\delta), \text{ or } X = (Z0/(Z+\delta))^{\wedge}\gamma'$$

$$XL = ZL0/(ZL+\delta), \text{ or } XL = (ZL0/(ZL+\delta))^{\wedge}\gamma'$$

(where, $\delta$ is 0 or a predetermined constant)

Next, using the reciprocal signals X, XL, the gain generator 14 calculates the following to generate a composite signal X1.

$$X1 = \delta + a1 \cdot X + a2 \cdot XL, \text{ or }$$

$$X1 = \delta + a1 \cdot X + a2 \cdot XL + a3 \cdot X \cdot XL + a4 \cdot X \cdot X + a5 \cdot XL \cdot XL + \text{(high-order terms of } X \text{ and } XL\text{)}$$

(where the coefficients a1, a2 ... are predetermined constants, and $\delta$ is 0 or a predetermined constant.)

Next, the gain generator 14 applies predetermined processing h( ) to the composite signal X1 to find the transformation gain k=h(X1).

As the processing h( ) applied to the composite signal X1 here, preferable is at least one processing among gain limiter, exponentiation, gain decrease in the vicinity of 0, approximation of the gain to 1 when Z has a larger value than a predetermined value, a change of the shape of the curve, and gain suppression of a high-luminance portion.

Figure 5:
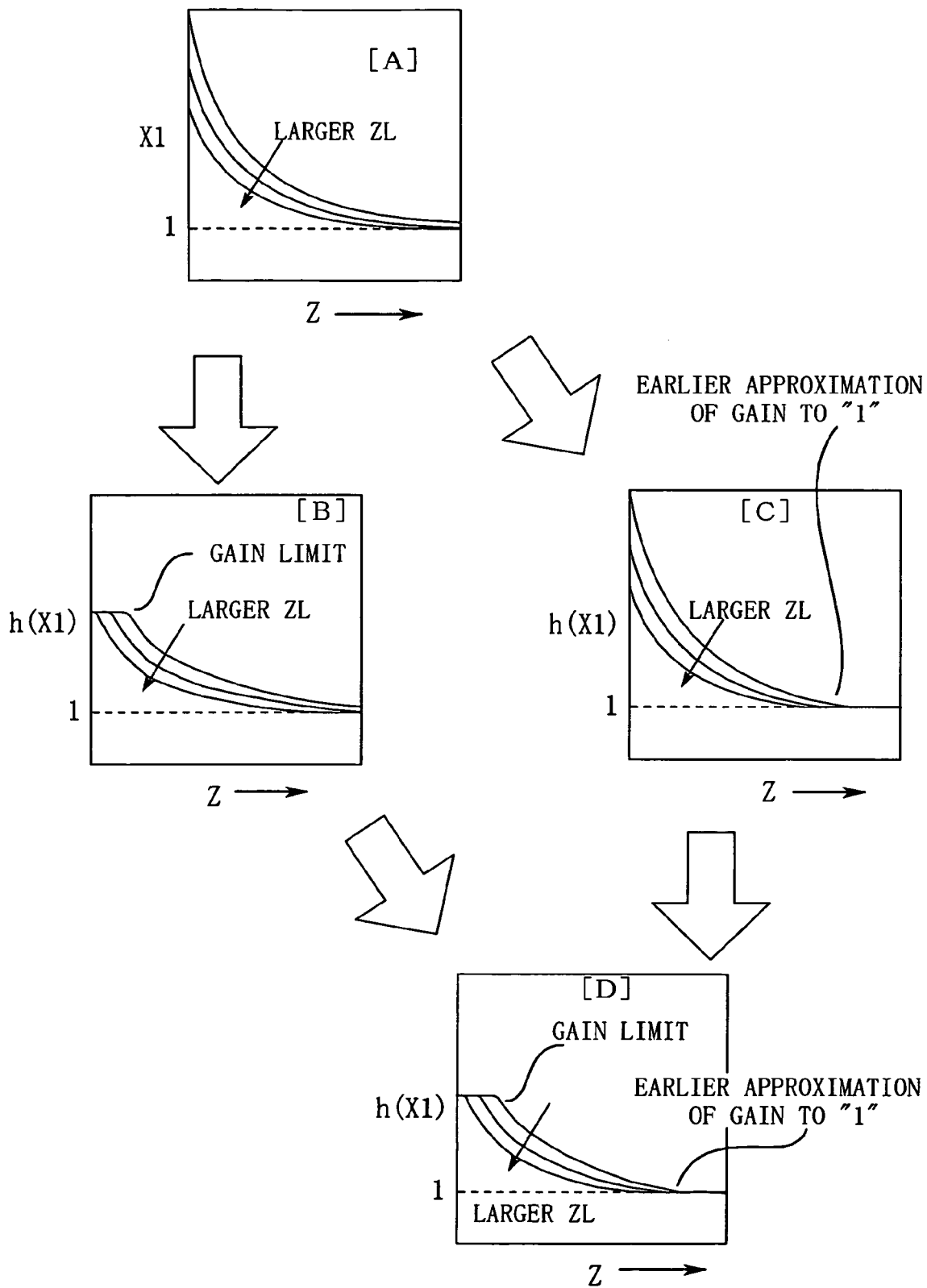
FIG. 5[A] to FIG. 5[D] are charts showing examples of the tone transformation characteristic.

FIGS. 5[A] to 5[D] are charts showing examples of such processing h( ).

FIG. 5[A] shows the relation between the signals Z, ZL and the composite signal X1.

FIG. 5[B] shows a case where a gain limit is set by restricting an upper limit of the composite signal Z1.

FIG. 5[C] shows a case where the processing of the approximation of the gain to 1 when the signal Z has a larger value than the predetermined value is applied.

FIG. 5[D] shows a case where the combination of the processing in FIG. 5[B] and the processing in FIG. 5[C] is applied.

[Step S5]

The tone transformation unit 15 multiplies the color component of the pixel [i, j] or the signal component generated from the color component by the transformation gain k found for the pixel [i, j] to perform the tone transformation.

(case 1) When R, G, and B are the plural color components composing the original image, R', G' B' signals resulting from the transformation using the transformation gain are calculated by the following.

$$R'=k \cdot R, \ G'=k \cdot G, \text{ and } B'=k \cdot B$$

(case 2) In a case of a brightness signal indicating luminance or an amount of brightness and input signals indicating a plurality of color differences, the brightness signal is multiplied by the transformation gain k, whereby a brightness signal after the tone transformation is calculated. Further, color differences C1', C2' after the tone transformation are calculated by $$C1'=k \cdot C1 \text{ and } C2'=k \cdot C2,$$

where C1 and C2 are the input signals indicating the plural color differences.

Some tone transformation is accompanied by a change in visual saturation. For correcting this saturation change, a transformation gain k1 after correction is used instead of the transformation gain k.

$$C1'=k1 \cdot C1 \text{ and } C2'=k1 \cdot C2$$

Here, the transformation gain k1 after the correction is found by $$k1 = k \cdot t(Z) \text{ or } k1(Z, ZL) = k(t(Z), ZL),$$

where t(Z) is a function monotonically changing with respect to Z. Note that the function t(Z) is preferably determined based on experiments so that the visual saturation becomes appropriate.

(case 3) In a case of the brightness signal indicating luminance or an amount of brightness and an input signal indicating saturation C, the brightness signal is multiplied by the transformation gain k(Z), whereby a brightness signal after the tone transformation is calculated. Further, the saturation after the tone transformation is calculated by C1'=k·C, where C' is the saturation after the tone transformation. Note that C1'=k1·C may be calculated using the aforesaid k1.

(case 4) For a signal of the Lab color space, L', a', and b' after the tone transformation are calculated by the following equations:

$$L'=k \cdot L, \ a'=k \cdot a, \text{ and } b'=k \cdot b$$

Note that a'=k1 a and b'=k1 ·b may be calculated using the aforesaid k1.

<<Effects etc. of First Embodiment>>

In the first embodiment, the transformation gain k for the pixel [i, j] is increased/decreased for adjustment depending not only on the signal Z obtained from the pixel [i, j] of the original image but also on the signal ZL obtained from its neighborhood area. As a result, a value of the transformation gain k in a dark neighborhood area and that in a bright neighborhood area become different from each other, so that the tone transformation in which the rise of the tone in the detailed portion is adjusted is made possible.

Next, another embodiment will be described.

Second Embodiment

Figure 6:
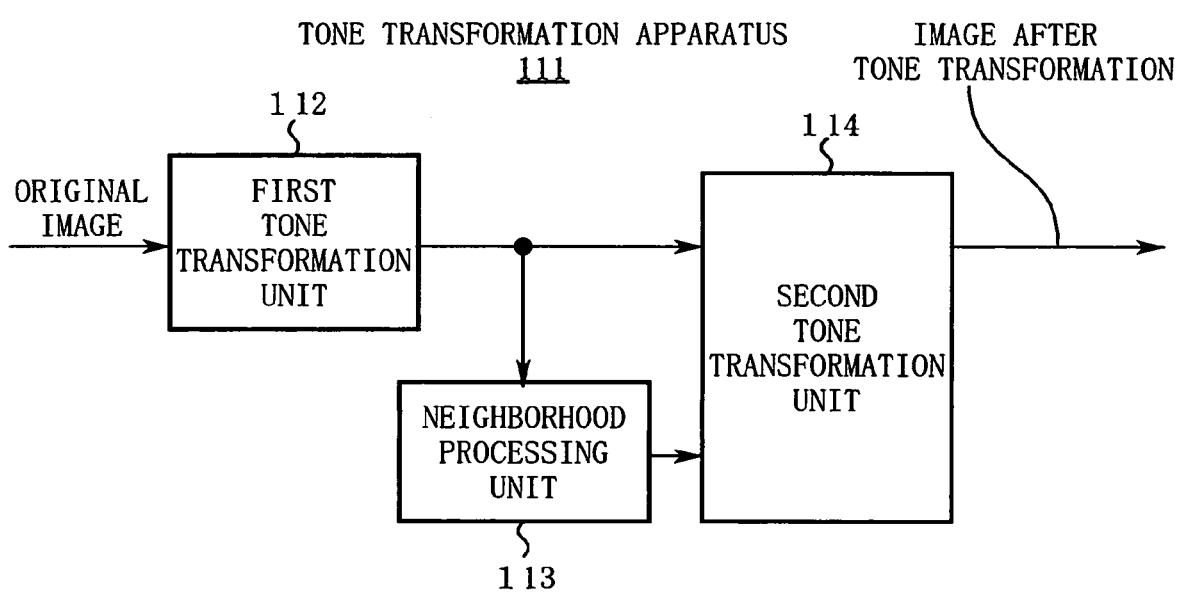
FIG. 6 is a block diagram showing a configuration of a tone transformation apparatus in a second embodiment.

FIG. 6 is a diagram showing a configuration of a tone transformation apparatus 111.

In FIG. 6, the tone transformation apparatus 111 has the following constituent features.

(1) a first tone transformation unit 112 to transform the tone of an original image to adjust the general brightness/darkness balance, thereby obtaining a first tone transformation result.

(2) a neighborhood processing unit 113 to process a neighborhood area of a pixel [i, j] after the first tone transformation to generate a signal ZL.

(3) a second tone transformation unit 114 to apply tone transformation to the first tone transformation result, depending on the signal ZL, thereby to generate a second tone transformation result, and to perform image composition of the first tone transformation result and the second tone transformation result to generate a tone transformed output.

The above-described tone transformation apparatus 111 may be partly or entirely composed of hardware. Further, the tone transformation apparatus 111 may be realized on a computer as software with the use of a tone transformation program.

The configuration in which the tone transformation apparatus 111 is mounted in an electronic camera is the same as that of the first embodiment (FIG. 2), and therefore description thereof will be omitted here.

Figure 7:
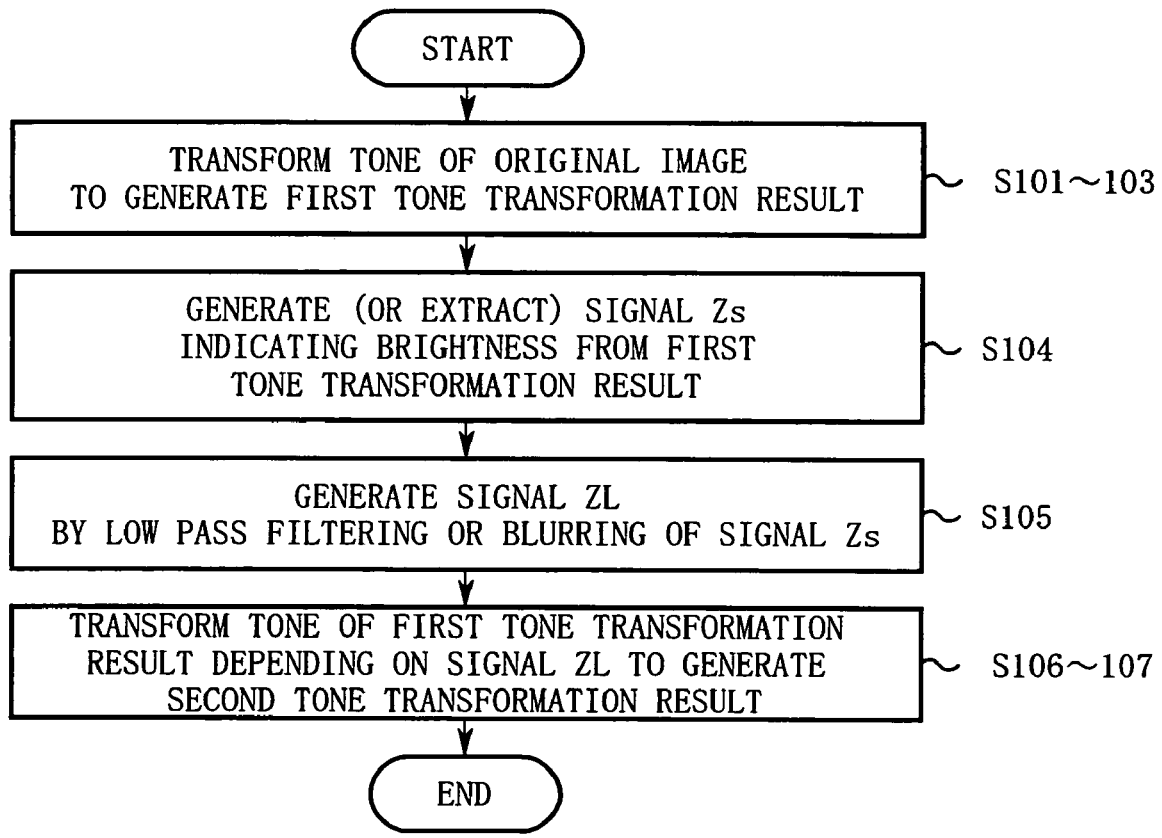
FIG. 7 is a flowchart showing image processing operations in the second embodiment.

FIG. 7 is a flowchart to describe operations of the tone transformation apparatus 111 in the second embodiment.

In many cases, a plurality of color components composing the original image are (R, G, B), (Y, Cr, Cb), (L, a, b), or the like. Hereinafter, the operations of the tone transformation apparatus mainly in these cases will be described, but the same processing is possible also in a case of other color space. Note that each step number in the following description corresponds to the step number in the flowchart shown in FIG. 7.

[Step S101] The first tone transformation unit 112 extracts or generates a signal Z[i, j] reflecting brightness (such as luminance or lightness) from the inputted original image. Note that [i, j] represents coordinates of the pixel.

As a method of calculating the signal Z, the method described at Step S2 in the first embodiment is preferable.

[Step S102] The first tone transformation unit 112 generates a transformation gain kz(Z) depending on the signal Z [i, j].

The transformation gain kz at this step may be generated by any method. The simplest method is processing using the following gamma transformation equation.

$$kz(Z)=Z^\gamma$$

Generally, a dark original image is often transformed to a bright image, and therefore, a value of γ is set to an appropriate value within a range of 0.1<γ<1, for example, 0.5. In actual practice, the value of γ is preferably changed depending on average brightness of the original image and target image brightness.

Further, in order to inhibit tone jump in a portion where a value of Z is small (dark portion), a gamma curve of the dark portion may be replaced by a direct function (linear function).

The transformation gain kz(Z) may be calculated by kz(Z)= (Z+δ)∧γ, or if it cannot be expressed by a specific function, the relation of Z and kz(Z) may be provided as a LUT (lookup table).

[Step S103]

The first tone transformation unit 112 applies tone transformation to a color component of the original image or a color component composed from color components of the original image, by using the transformation gain kz, thereby generating the first tone transformation result (represented by letters with ').

When the original image is an RGB image, R'=kz·R, G'=kz·G, and B'=kz·B.

When the original image is a YCbCr image, Y'=kz·Y, C1'=k1·C1, and C2'=k1·C2 (C1 and C2 are color differences).

When the original image is a Lab image, L'=kz·L, a'=k1·a, and b'=k1·b.

As k1 in the equations, kz is used as it is, or a function resulting from the correction of kz including the adjustment of saturation is preferably used. Preferable examples of the correction processing of kz are as follows: k1=c·kz(Z) in which kz is multiplied by the constant c (for example, 0.8 times); and k1=t(Z)·kz(Z), k1=kz(t(Z)), or the like in which a function t(Z) in an appropriate form that is dependent on Z is used in order to adjust saturation that is dependent on brightness.

[Step S104] The neighborhood processing unit 113 extracts or generates, from the first tone transformation result, a signal Zs[i, j] reflecting brightness (such as luminance or lightness) and a color difference.

The generation method is the same as the method described at Step S101. For example, the following processing or the like may be applied.

$$Zs=\max(R', G', B') \quad (1)'$$

$$Zs=Y'+(|Cr'|+|Cb'|)/2 \quad (2)'$$

$$Zs=L'+(|a'|+|b'|)/2 \quad (3)'$$

[Sep S105] The neighborhood processing unit 113 obtains a signal ZL[i, j] that changes according to brightness of the neighborhood area of the pixel [i, j]. For example, the signal ZL that changes according to brightness on which the magnitude of brightness of each pixel is convoluted is found in such a manner that an image signal of the neighborhood area (for example, the signal Z, the signal Zs, a color signal, or a composed value of color signals, a signal reflecting brightness (such as luminance or lightness) and a color difference, or the like) is subjected to smoothing, low pass filtering, blurring, or the like.

Concretely, a plurality of image signals positioned in the neighborhood area are defined as the population, and an average value, a weighted average value, a median value, a mode value, an average value of values excluding the minimum and maximum values, an average value of pixel values in the neighborhood area whose difference from the pixel value falls within a predetermined value, or the like is found, and the found value is defined as the signal ZL.

Further, for example, when the original image is RAW data in which each pixel has missing color components, the aforesaid signal ZL may be calculated by using color components in the neighborhood instead of the missing color components of the pixel [i, j]. Further, the aforesaid signal ZL may be calculated after the missing color components of the RAW data are generated by interpolation.

Preferably, the signal ZL may be found in such a manner that a pixel whose value is as deviated as possible from the value of the pixel [i, j] is selected from the neighboring pixels around the pixel [i, j] and an image signal of this pixel or a local average value thereof is found. In this case, values of the signals Z, ZL reflect an anisotropic image structure, so that it becomes possible to adjust (emphasize or suppress) the rise of the anisotropic rise of the tone.

As a rough measure of a radius r representing the size of the neighborhood area, an appropriate value in a range roughly from 0.01 to 0.5, for example, 0.05 or the like of a diagonal length of the original image is preferable. Further, the signal ZL may be found by weighted-averaging the signals ZL found for a plurality of radiuses This signal ZL may be subjected to processing, for example, nonlinear processing such as exponentiation, and normalization.

[Step S106] The second tone transformation unit 114 generates a transformation gain ks(ZL) depending on the signal ZL[i, j].

The transformation gain ks that is generated depending on the signals Z, ZL is determined as a function dependent roughly on a ratio of Z and ZL. The simplest example is a function obtained by appropriately weighing a ratio (Z/ZL) as follows.

$$ks(ZL)=c \cdot \{(Z)/(ZL+\delta)\} \wedge p$$

The development of more general equations will be described in a third embodiment. [Step S107] The second tone transformation unit 114 applies the tone transformation to the first tone transformation result by using the transformation gain ks to subsequently generate the second tone transformation result (represented by letters with ").

When the original image is an RGB image, R"=ks·R', G"=ks·G', and B"=ks·B'.

When the original image is a YCbCr image, Y"=ks·Y', C1"=ks1·C1", and C2"=ks1·C2' (C1 and C2 are color differences).

When the original image is a Lab image, L"=ks·L', a"=ks1·a', and b"=ks1·b'.

Note that ks1 is a function as which ks is used as it is or is a function corresponding to the corrected ks. Consequently, a second tone transformed image whose tone is locally raised from that of the first tone transformation image can be obtained. Further, by changing the parameters at Step S106, it becomes possible to control the local rise of the tone, but if the first tone transformation result and the second tone transformation result are composed with a predetermined weight in generating a composite image and the weight of the composition is varied, it is possible to quickly obtain an image in which the rise of the tone is changed.

<<Effects etc. of Second Embodiment>>

In the second embodiment, the detailed tone adjustment using the signal ZL that changes according to brightness of the neighborhood area is executed independently from the adjustment of the brightness/darkness balance for the whole image. As a result, it is possible to realize both the brightness/darkness balance of the whole image and the detailed tone reproduction at a high level.

Next, another embodiment will be described.

Third Embodiment

Figure 8:
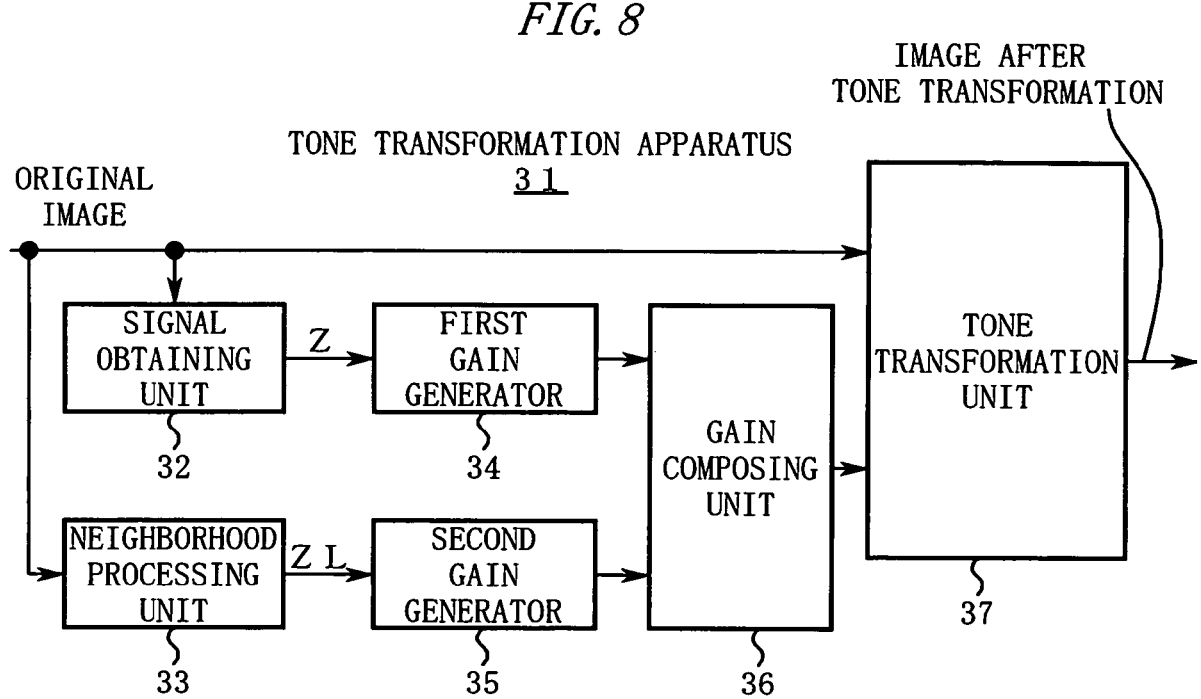
FIG. 8 is a block diagram showing a configuration of a tone transformation apparatus in a third embodiment.

FIG. 8 is a diagram showing a configuration of a tone transformation apparatus 31.

In FIG. 8, the tone transformation apparatus 31 includes the following constituent features.

(1) a signal obtaining unit 32 to obtain a signal Z from each pixel of an original image.
(2) a neighborhood processing unit 33 to process a neighborhood area of each pixel of the original image to obtain a signal ZL.
(3) a first gain generator 34 to generate a transformation gain kz depending on the signal Z.
(4) a second gain generator 35 to generate a transformation gain ks depending on the signal ZL.
(5) a gain composing unit 36 to generate a transformation gain k according to two kinds of the transformation gains kz, ks.
(6) a tone transformation unit 37 to transform the tone by multiplying a signal component of each pixel of the original image by the transformation gain k.

The above-described tone transformation apparatus 31 may be partly or entirely composed of hardware. Alternatively, the tone transformation apparatus 31 may be realized on a computer as software by the use of a tone transformation program.

The configuration in which the tone transformation apparatus 31 is mounted in an electronic camera is the same as that of the first embodiment (FIG. 2), and therefore description thereof will be omitted here.

Figure 9:
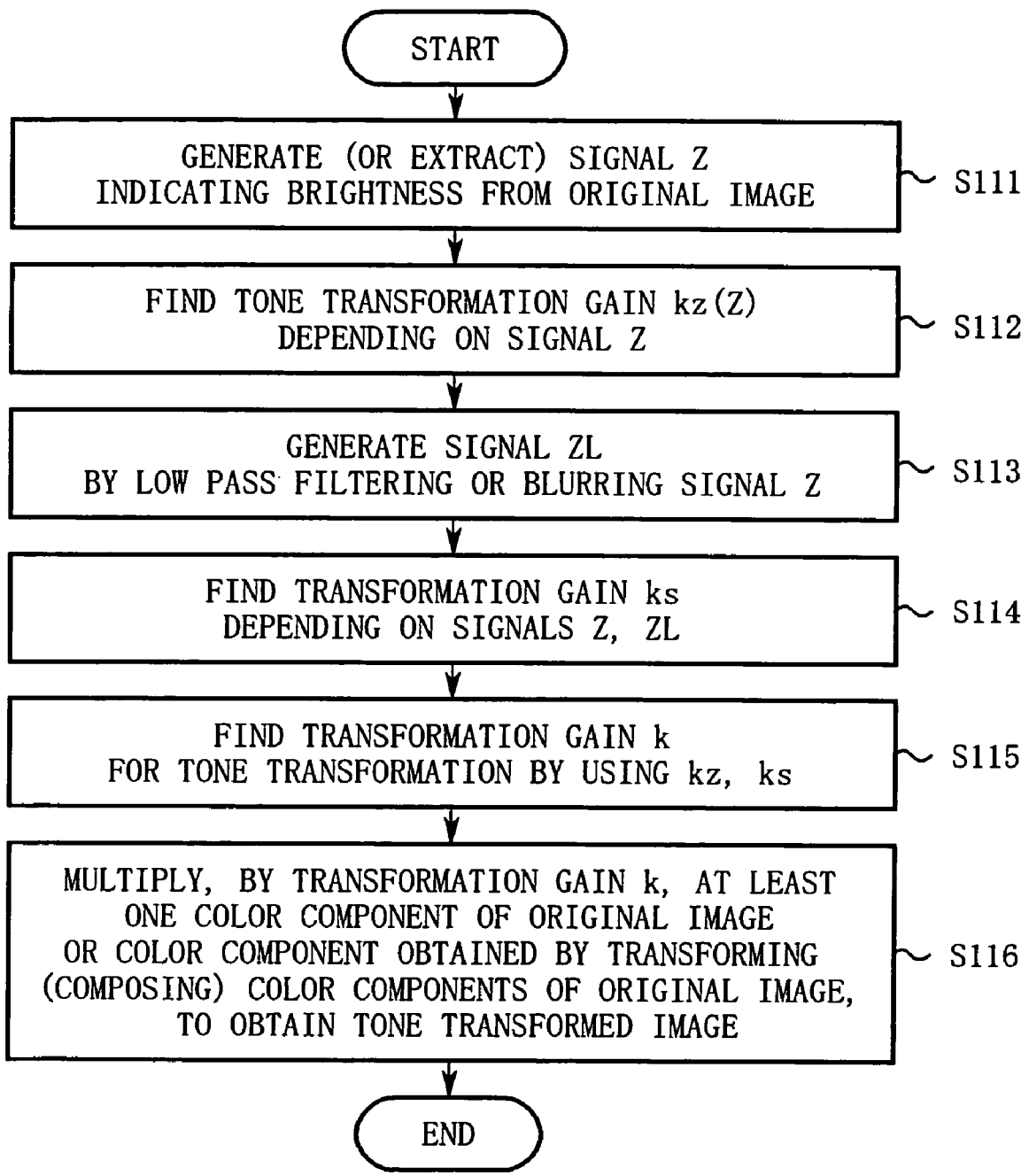
FIG. 9 is a flowchart showing image processing operations in the third embodiment.

FIG. 9 is a flowchart to describe operations of the tone transformation apparatus 31 in the third embodiment. Hereinafter, the operations will be described in the sequence of the step number shown in FIG. 9.

[Step S11] The signal obtaining unit 32 extracts or generates the signal $Z[i, j]$ reflecting brightness (such as luminance or lightness) and a color difference from the original image by the same processing as in the second embodiment.

[Step S112] The first gain generator 34 generates the transformation gain $kz(Z)$ depending on the signal $Z[i, j]$ by the same processing as in the second embodiment.

[Step S113] The neighborhood processing unit 33 processes the neighborhood area of the pixel $[i, j]$ of the original image to generate the signal $ZL[i, j]$. This processing is the same as that of Step S105 in the second embodiment, and therefore description thereof will be omitted here.

[Step S114] The second gain generator 35 generates the transformation gain ks according either to the signal ZL or to the signal ZL and the signal Z. The transformation gain ks generated depending on the signals Z, ZL is preferably determined as a function dependent roughly on a ratio of Z and ZL. Specifically, $Q[i, j]=(Z/ZL)$, or more generally, $Q[i, j]=(Z[i, j]+\delta 1)/(ZL[i, j]+\delta 2)$ using minute amounts $\delta 1$, $\delta 2$ may be used.

A more general expression may be $Q[i, i]=g(Z[i, j])/g(ZL[i, i])$. Note that the function $g(x)$ is a monotonically increasing function of x, and a preferable example thereof is: a power function $x^{\wedge}t$ or its transformation $(x+c)^{\wedge}t$; a function that is expressed by $g(x)=kz(x) \cdot x$ using or the transformation gain kz or its transformation; or a predetermined monotonically changing function given in a LUT.

Figure 10:
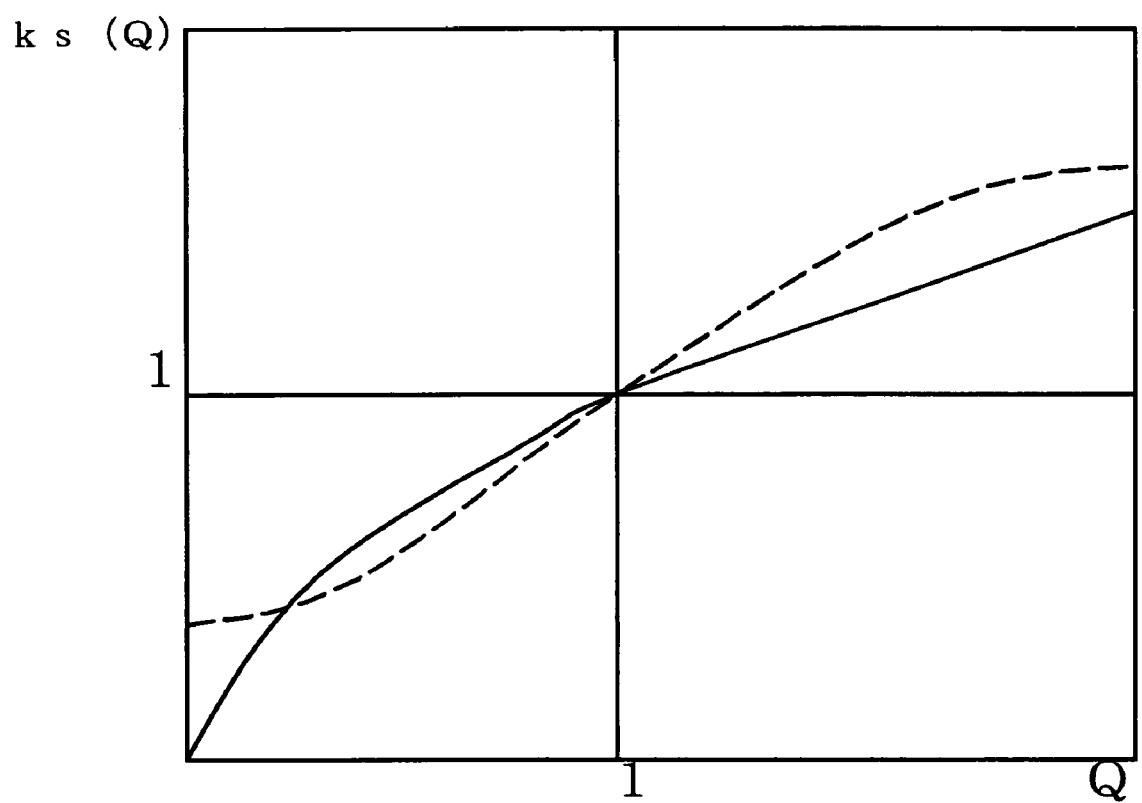
FIG. 10 is a chart showing an example of a function ks(Q)

The transformation gain $ks(Q)$ may be given as a simple power function $ks(Q)=Q^{\wedge}p$, or more generally, as a monotonically increasing function of Q by using the function Q, for example, as shown by the solid line curve or the broken line curve shown in FIG. 10.

Note that as such a curve, a curve expressed by an equation $ks=(Q[i, j]-1)\times\alpha+1$ is preferably used. Note that $\alpha$ is preferably a variable that changes depending on $Q[i, j]$. In this case, a fixed constant is preferably given to the variable $\alpha$ according to a range of $Q[i, j]$. For example, by determining a gradient of the transformation gain to the function Q based on a difference in brightness between the neighboring pixel and the relevant pixel, which is expressed by $Q[i, j]$, it is possible to make the tone correction realizing a favorable impression locally while maintaining the brightness/darkness balance of the whole image. Note that $\alpha$ may be a constant in order to reduce the load of the arithmetic processing. In this case, it is also possible to make the tone correction that is locally favorable to some degree while maintaining the brightness/darkness balance of the whole image.

Figure 11:
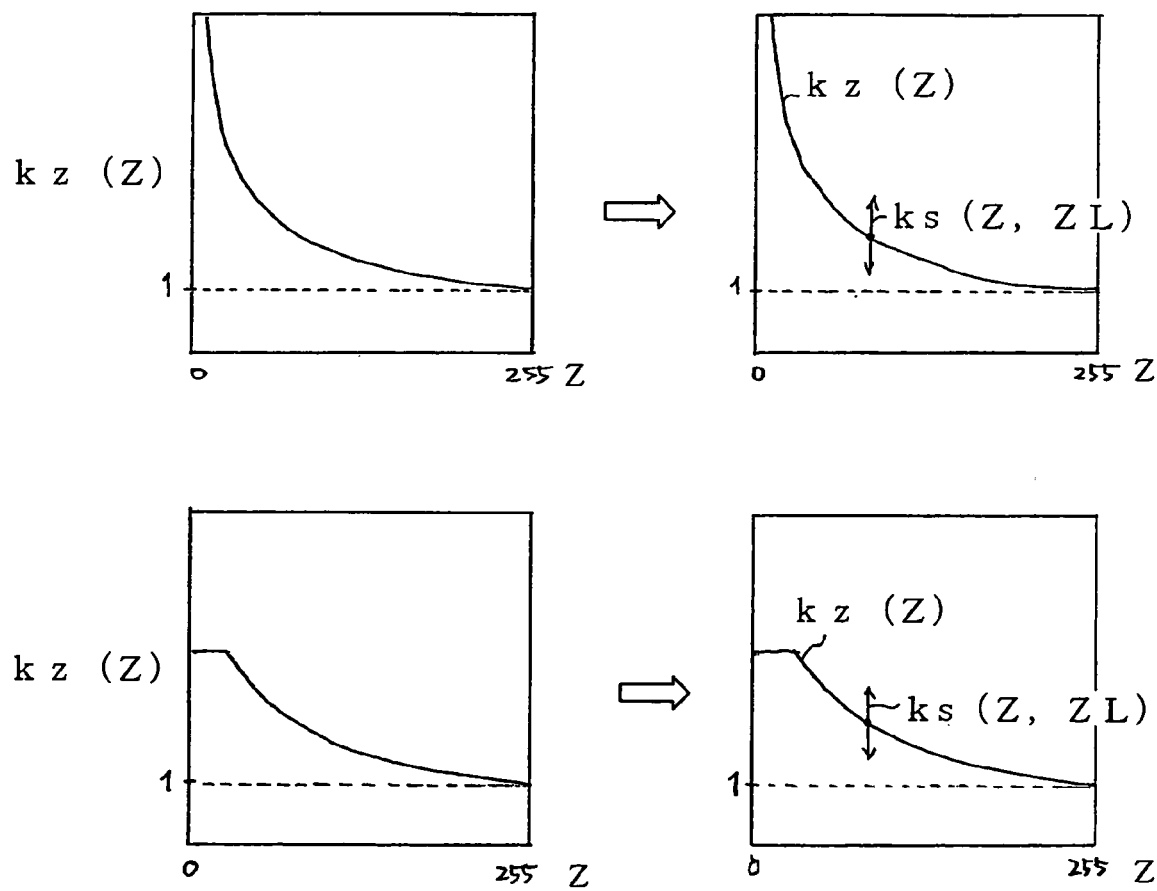
FIG. 11 is a chart showing examples of a tone transformation characteristic.

Through such processing, the transformation gain ks is turned into the function $ks(Z, ZL)$ that is the function $ks(Q)$ of Q and changes depending on the signals Z, ZL (see FIG. 11).

Such processing sometimes causes a conspicuous overshoot or undershoot in a belt shape at the border of the bright and dark portions in a bright part in accordance with an excessive tone increase of the image. An effective transformation gain $ks(Z, ZL)$ to solve such a problem is a function that is less dependent on the ratio $Z[i, j]/ZL[i, j]$ and becomes approximate to a predetermined value in a portion with a large $Z[i, j]$ or $ZL[i, j]$ (a bright portion) than in a portion with a small $Z[i, j]$ or $ZL[i, j]$ (a dark portion).

As concrete examples of such a function, the following functions or the like are preferable.

$Q[i, j]=\{(Z[i, j]+\delta 1)/(ZL[i, j]+\delta 2)\}^{\wedge}p1$ ($\delta 1$ and $\delta 2$ in the equation are minute amounts for divergence prevention), $t=C \cdot (Z[i, j]/Zm)^{\wedge}p2; \{0<=t<=1\}$ (p1, p2, and Zm are predetermined values)

$ks[i, j]=Q[i, j] \cdot (1-t)+t$

[Step S115] The gain composing unit 36 generates the transformation gain k by using the transformation gains kz and ks. For example, the transformation gain k is given as $k=kz \cdot ks$, or it may be calculated by the following equation by using composition weights a1, a2, where at least a2 is not 0.

$k=kz \cdot (a1+a2*ks))/(a1+a2)$

Note that the aforesaid signal Z is preferably used for the gain kz, but for ks, Y may be used instead of Z, and YL may be used instead of ZL, the YL being low-pass filtered or blurred Y.

Depending on the flow of a program, the use of Y enables higher-speed processing.

[Step S116] The tone transformation unit 37 transforms the tone by multiplying at least one color component of the original image or a color component composed from color components of the original image by the transformation gain k. An image after such tone transformation (represented by letters with ") is as follows.

When the original image is an RGB image, $R''=k \cdot R$, $G''=k \cdot G$, and $B''=k \cdot B$.

When the original image is a YCbCr image, Y"=k·Y, C1"=k'·C1, and C2"=k'·C2(C1 and C2 are color differences).

When the original image is a Lab image, L"=k·L, a"=k'·a, and b"=k'·b.

Note that k' in the equations is a function as which k is used as it is or is a function corresponding to the corrected k.

As for the combination of the signal Z and the signal ZL, the inventor has found preferable combinations from experiments.

For example, when a signal including brightness such as luminance or lightness and color difference information (CbCr of YCbCr and ab of Lab) is adopted as the signal Z, adopting as the signal ZL a signal indicating brightness of a neighborhood area produces an excellent effect. Concretely, as the signal ZL, a signal corresponding to Y of YCbCr is adopted. Further, as the signal ZL, a signal corresponding to L of Lab is adopted. Further, as the signal ZL, a signal corresponding to max(RGB) may be adopted. Of course, the signal ZL may be generated based on the brightness and the color difference information that are previously used in obtaining the signal Z.

Besides, when max(RGB) is adopted as the signal Z and a signal obtained from max(RGB) of the neighborhood area is also used as the signal ZL, a moderate degree of effect is also obtained, though the effect is not as large as that in the above-described case. In particular, when the original image is expressed in the RGB color space, this is preferable because the load of the arithmetic processing is reduced. This is especially suitable for a device, such as an electronic camera, whose hardware has a limited computing power.

<<Effects etc. of Third Embodiment>>

In the third embodiment, the detailed tone adjustment using the signal ZL that changes according to brightness of the neighborhood area is made independently from the adjustment of the brightness/darkness balance for the whole image. As a result, it is possible to realize both the brightness/darkness balance of the whole image and the detailed tone reproduction at a high level.

Next, another embodiment will be described.

Fourth Embodiment

A configuration of a fourth embodiment is the same as that of the first embodiment (FIG. 1 and FIG. 2), and therefore description thereof will be omitted here.

Figure 12:
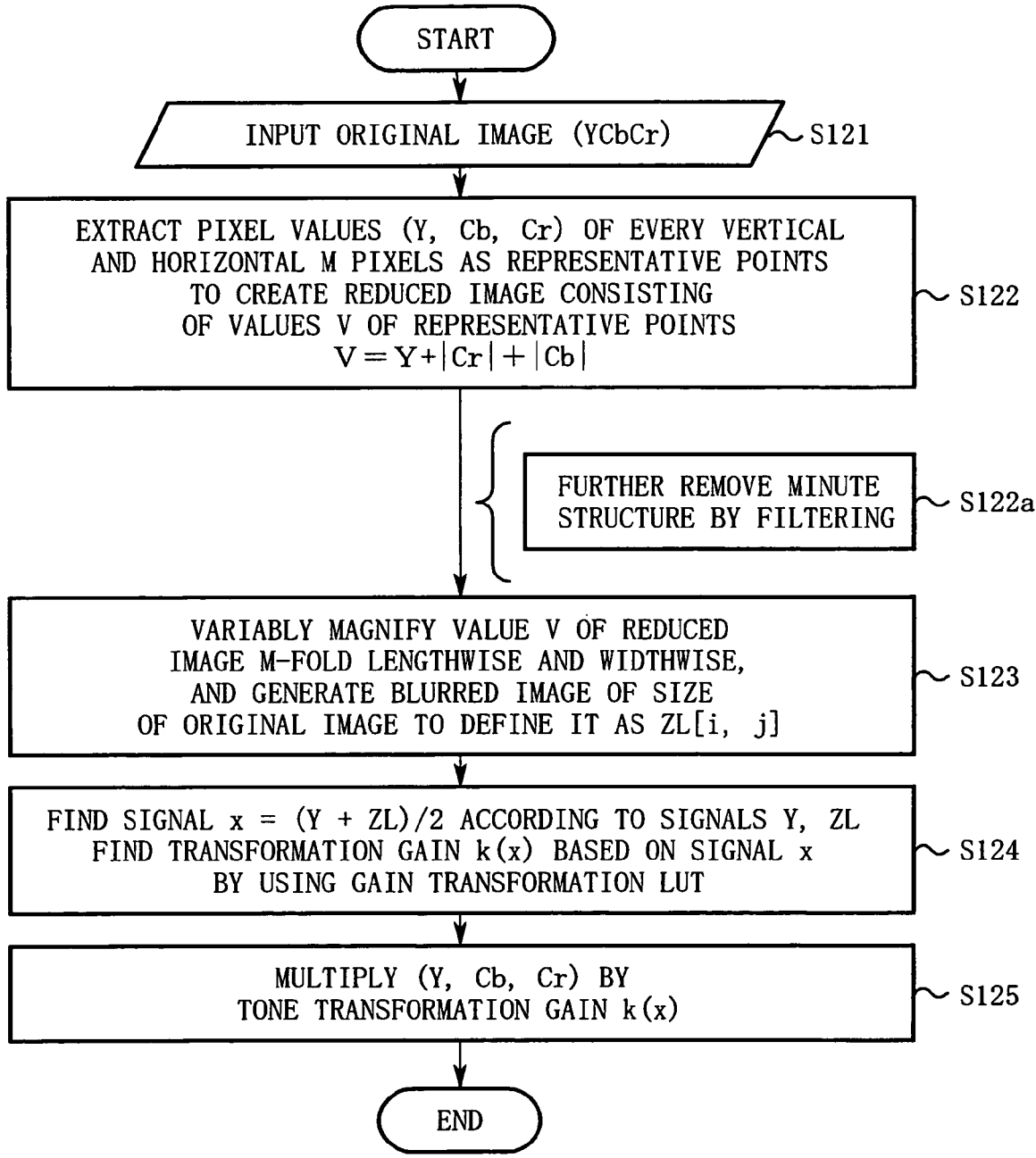
FIG. 12 is a flowchart to describe operations of a fourth embodiment.

FIG. 12 is a flowchart to describe operations of the fourth embodiment. Hereinafter, the operations of the fourth embodiment will be described in the sequence of the step number shown in FIG. 12.

[Step S121] A tone transformation apparatus 11 takes in an original image. This original image is composed of color components of (Y, Cr, Cb).

[Step S122] A signal obtaining unit 12 extracts or generates a value Y (corresponding to a first signal Z) from a pixel [i, j] of the original image or from its immediate neighborhood.

A neighborhood processing unit 13 finds a second signal ZL dependent on a neighborhood area that is larger than the immediate neighborhood. Here, for example, one-component image reflecting an influence of the neighborhood area (for example, 8 pixels or more) is generated. Concretely, three components Y[i, j], Cr[i, j], Cb[i, j] are extracted from representative points of every vertical and horizontal M pixels of the original image and each representative value is calculated by the following equation. Note that M≧2, preferably M≧8. M for the vertical pixels and M for the horizontal pixels may be different.

$$Z[i,j]=V[i,j]=Y[i,i]+|Cr[i,j]|+|Cb[i,j]|$$

This may be replaced by the following in which weights w1, w2 of |Cr[i, j]| and |Cb[i, j]| are appropriately set.

$$Z[i,j]=V[i,j]=Y[i,j]+w1\cdot|Cr[i,j]|+w2\cdot|Cb[i,j]|$$

[Step S123] The neighborhood processing unit 13 variably magnifies a reduced image, which consists of a set of the representative points of every M pixels, M-fold lengthwise and widthwise, thereby creating an image of a size of the original image. This image is one component image of a signal V in which a minute structure is removed from the original image. A value of the pixel position [i, j] of this one-component image is defined as ZL[i, j].

[Step S124] The gain generator 14 finds a composite signal x[i, j]=(Y[i, j]+ZL[i, j])/2 from the signal Y[i, j] and the signal ZL[i, j].

The gain generator 14 sequentially substitutes the composite signal x[i, j] in a gain transformation coefficient k(x) to find a gain map k[i, j] for one screen.

Figure 13:
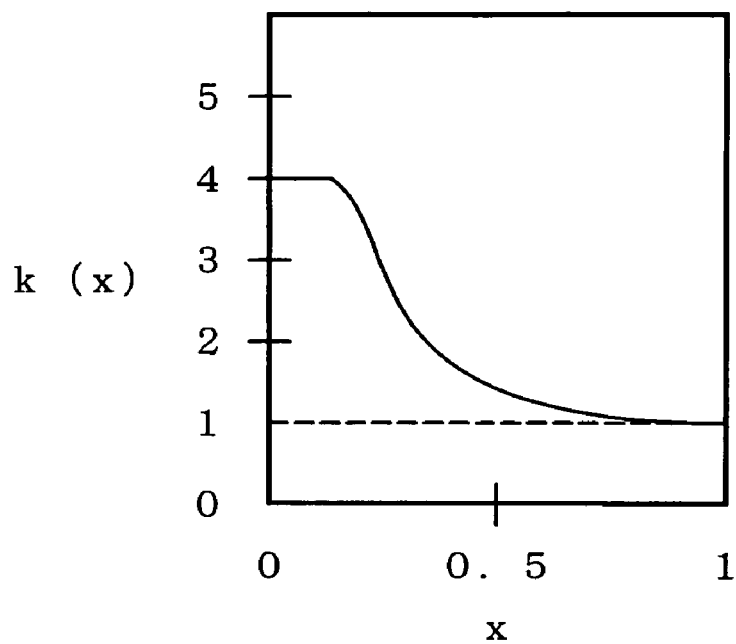
FIG. 13 is a chart showing an example of a function of a gain curve.

FIG. 13 is a chart showing an example of this gain transformation coefficient k(x).

This function k(x) is a function that reaches the maximum gain, that is, 2 to 10, in a region where x is small and decreases as x increases. A gain transformation LUT (lookup table) storing the numerical value correspondence of the gain transformation coefficient k(x) may be used for quickly finding the transformation gain k from the composite signal x. [Step S125] A tone transformation unit 15 applies the tone transformation expressed the following equations for each pixel [i, j] of the original image.

$$Y'[i,j]=k[i,j]\times Y[i,j]$$

$$Cr'[i,j]=k[i,j]\times Cr[i,j]$$

$$Cb'[i,j]=k[i,j]\times Cb[i,j]$$

Through such processing, an image Y'Cb'Cr' after the tone transformation is obtained.

<<Effects etc. of Fourth Embodiment>>

As describe above, in the fourth embodiment, the reduced image consisting of the representative points of every M pixels is created and this reduced image is magnified M-fold, whereby the signal ZL reflecting the neighborhood area is obtained. This enables quicker calculation of the signal ZL compared with the calculation of the signal ZL by pixel-by-pixel filtering.

Further, the use of a quick view image as the reduced image of the fourth embodiment is also preferable. Generally, the quick view image is created in addition to a high-resolution image in an electronic camera and a computer as simple display of an image. Sometimes, the quick view image is stored in advance in an image file of the original image. The use of the quick view image enables higher-speed calculation of the signal ZL.

In the fourth embodiment, the signal ZL in which the minute structure is automatically removed is calculated by variably magnifying the reduced image as it is. However, further executing filtering in this process to remove the minute structure to a more appropriate degree is also effective.

Further, in the fourth embodiment, if ZL[i, j] is used as it is, shadows tend to be excessively exaggerated depending on an image. This can produce a favorable impression and effect in an image such as a scenery image. However, a figure image, if its shadows are unnaturally exaggerated, gives an unnatural impression.

In this case, including the structure of Y[i, j] in ZL[i, j] as in the following equation provides an effect of inhibiting the exaggeration of shadows.

$$ZL[i,j] = Y[i,j] \times (1-\alpha) + ZL[i,j] \times \alpha$$

(note that $0<\alpha 1$, and the optimum $\alpha$ is preferably determined experimentally.) It has been confirmed that thus including the structure of Y[i, j] in ZL[i, j] provides an effect not only of inhibiting the exaggeration of shadows but also of inhibiting the occurrence of a halo in a place with a great brightness difference.

Fifth Embodiment

The fifth embodiment relates to an improvement of Step S122 of the fourth embodiment.

Specifically, in the fifth embodiment, a value Z[i, j] of each of the representative points of every M pixels is found from values of its neighboring pixels. For example, an average value in a neighborhood within a range of r from the representative point [i. j] is calculated by the following equation to find Z[i, j] of the representative point [i. j].

$$Z[i,j] = \left[ \sum_{-r \leq s,t < r} (Y[i+s, i+t] + |Cr[i+s, i+t]| + |Cb[i+s, i+t]|) \right] / S$$

where $S = (2 \times r + 1) \times (2 \times r + 1)$

The representative value Z[i. j] of the reduced image is not limited to this but may be a median value in the neighborhood area. Further, the representative value Z[i, j] i may be an average value of values in the neighborhood area excluding values greatly deviated by a predetermined value or more.

Generally, when a sampling pitch M is small, the necessity for averaging processing in the neighborhood of the representative point is low. However, when the sampling pitch M is equal to or larger than a certain degree, such averaging processing can produce a better result.

The other processing is the same as that of the fourth embodiment, and therefore description thereof will not be repeated here.

Sixth Embodiment

A sixth embodiment relates to an improvement of Step S122 in the fourth and fifth embodiments.

Here, in the process of finding the reduced image, filtering is inserted as Step S122a. An effective example of filtering is a local product sum operation using the following local operator.

$$\begin{bmatrix} 1 & 2 & 1 \\ 2 & 4 & 2 \\ 1 & 2 & 1 \end{bmatrix}$$

Of course, the coefficients and matrix size of the filtering are not limited to the above.

Such filtering is effective processing when only the variable magnification of the reduced image does not suffice for smoothing the signal ZL.

The other processing is the same as that of the fourth embodiment, and therefore description thereof will not be repeated here.

Seventh Embodiment

Figure 14:
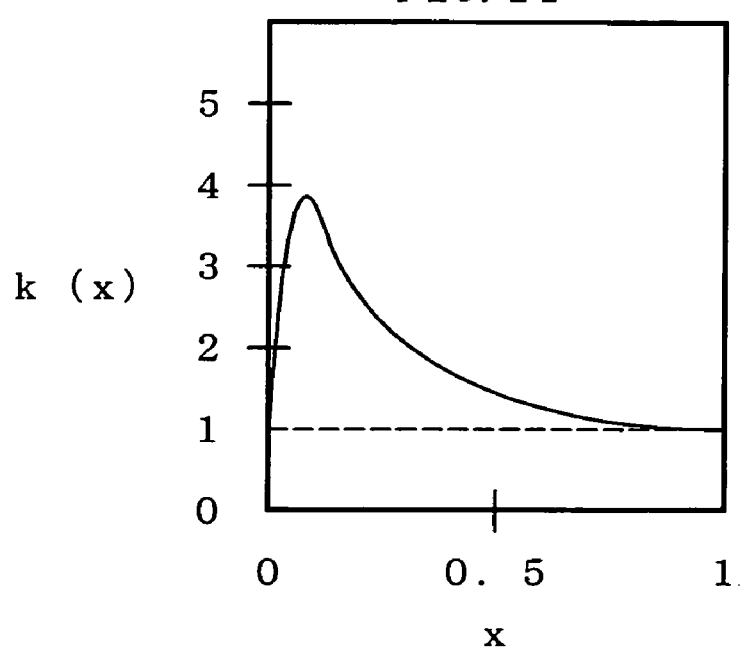
FIG. 14 is a chart showing an example of the function of the gain curve.

In the fourth embodiment, when the composite signal x is small, the gain k is made large, as shown, for example, in FIG. 13. However, it is expected that such a function k(x) of the gain curve may cause an adverse effect such as an emphasized noise in a dark portion depending on an image. When the noise in the dark portion is thus large, or when the level in a portion whose pixel value is close to zero is preferably reduced, it is preferable that the gain k is set close to 1 in a region where the composite signal x is close to zero, as shown in FIG. 14.

Figure 15:
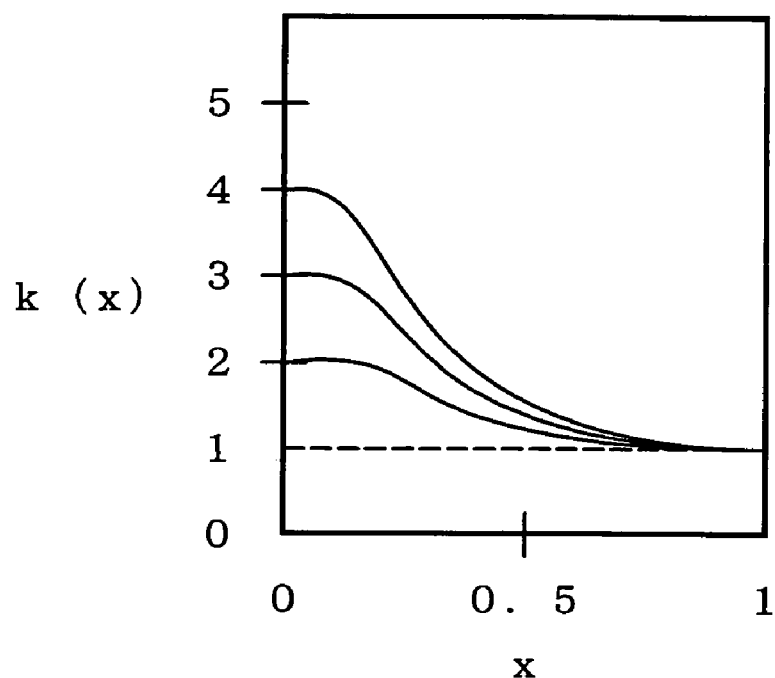
FIG. 15 is a chart showing an example of the function of the gain curve.

Further, in FIG. 13, the maximum gain in the dark portion is set to four, but the maximum gain in the dark portion can be arbitrarily set as shown in FIG. 15. In this case, the maximum gain is preferably set to roughly 15 or less. In an electronic camera or a computer, the maximum gain shown in FIG. 15 may be switched according to the result of selection from high, moderate, low which are provided as options for tone compression.

Figure 16:
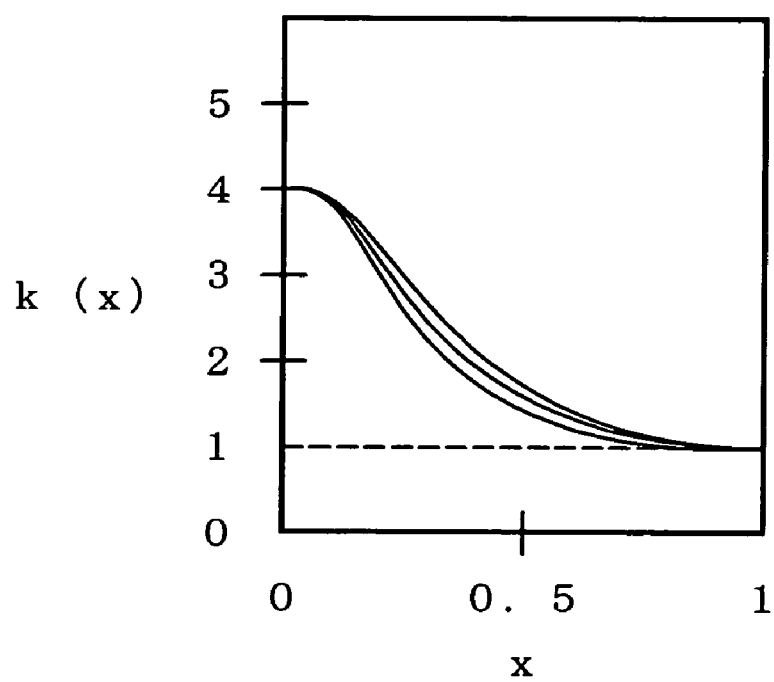
FIG. 16 is a chart showing an example of the function of the gain curve.

Note that brightness change in a moderate-brightness portion and a high-brightness portion in the tone transformation can be achieved by changing the gain curve in an intermediate region of the composite signal x as shown in FIG. 16.

The other processing is the same as that of the fourth embodiment, and therefore description thereof will not be repeated here.

Eighth Embodiment

Figure 17:
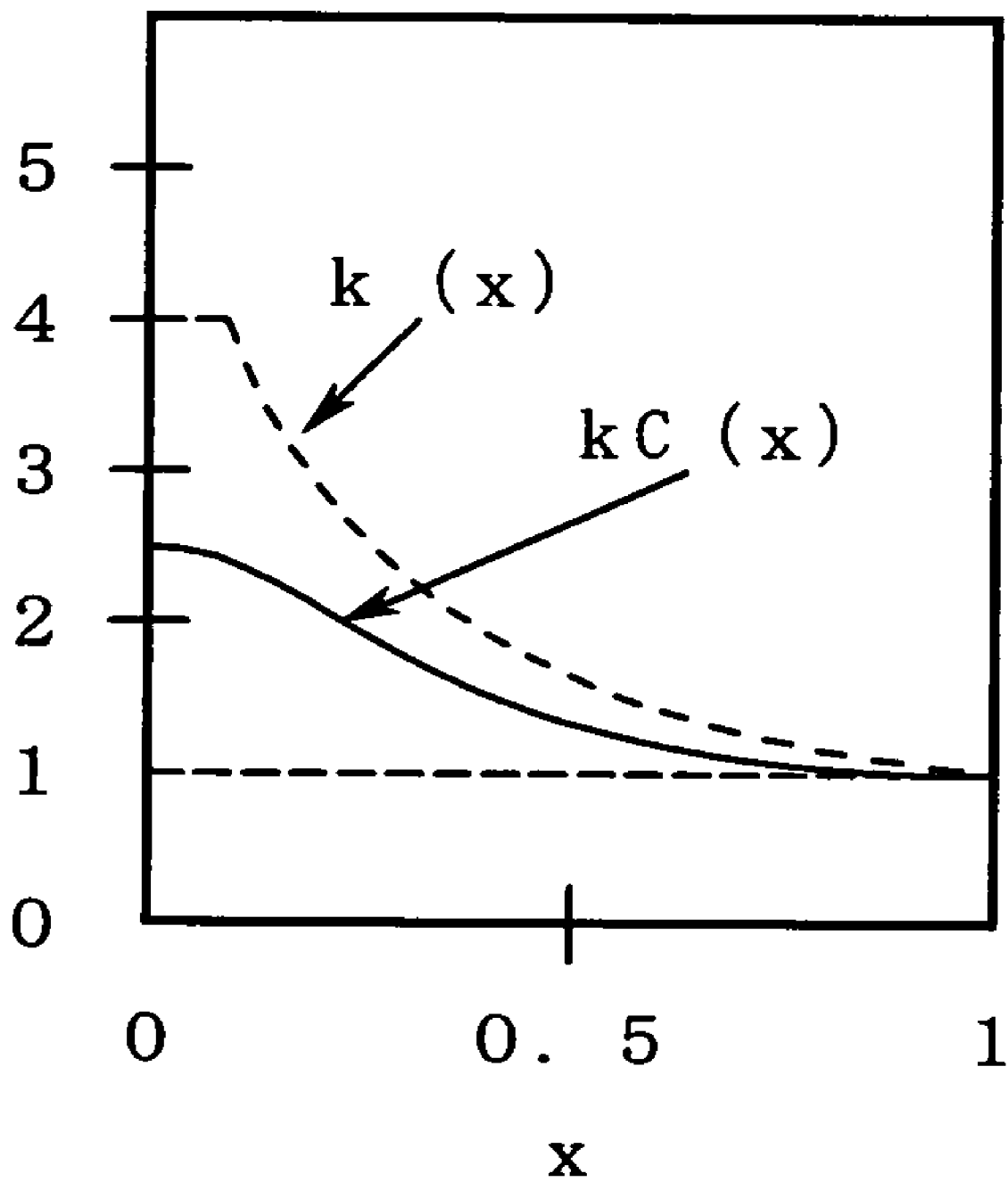
FIG. 17 is a chart showing an example of the function of the gain curve.

In a kind of dynamic range compression described above, saturation in the dark portion sometimes gets excessively high. In such a case, the transformation gain k[i, j] of the color difference components is changed to, for example, kC[i, j] shown in FIG. 17 as in the following equations.

$$Y'[i,j] = k[i,j] \times Y[i,j]$$

$$Cr'[i,j] = kC[i,j] \times Cr[i,j]$$

$$Cb'[i,j] = kC[i,j] \times Cb[i,j]$$

The relation of k(x) and kC(x) is preferably determined through experiment based on subjective evaluation of image quality. Further, it is also preferable to record kC(x) as a LUT.

Supplemental Items of Embodiments

The above embodiments have described the cases where the tone transformation is executed by using a tone transformation apparatus, a computer, or an electronic camera. However, the present invention is not limited thereto. For example, the above-described tone transformation methods may be provided in an image processing server (image album server and the like) on the Internet as a service to users, allowing the users to apply the methods to their image data.

Further, the above embodiments have described the cases where the tone transformation is applied to the whole image.

However, the present invention is not limited thereto. For example, the tone transmission may be applied only to part of a screen (a main subject, a shadow portion, a trimming range, a face recognition area, a background portion excluding a figure and a flesh color area, or the like).

In the above embodiments, the signal Z is found from the pixel value of the pixel position [i, j]. However, the embodiments are not limited thereto. For example, the signal Z may be found from a pixel value in an immediate neighborhood of the pixel position [i, j]. For example, since in RAW data, all the colors are not obtained for each pixel, the signal Z may be generated by adding other colors in the immediate neighborhood.

Further, in the above embodiments, the predetermined k( ) is used as the function of the gain curve. However, the embodiments are not limited to this. For example, the predetermined k( ) may be adaptively or selectively changed according to an image or a image-capturing condition.

Differences between the above-described embodiments and Patent document 2 will be described for reference.

(1) In Patent document 2, a gain F is controlled by an Epsilon filter value (a small amplitude component in a high band). On the other hand, in the above-described embodiments, the gain k is controlled both by the pixel value and by the value of the neighborhood area. In this respect, the embodiments are different from Patent document 2.

(2) Patent document 2 does not describe any method for a color image. On the other hand, in the above-described embodiments, the plural color components of a color image are composed, whereby one signal plane (for example, the signal Z or the like), which controls the gain k, is generated. In this respect, the embodiments are different from Patent document 2.

(3) Further, in the above-described embodiments, the gain k changes, reflecting the two signals Z, ZL. This is also what makes the embodiments different from Patent document 2.

(4) Moreover, in the above-described embodiments, variations such as Z=Y and ZL=VL are possible. This is also what makes the embodiments different from Patent document 2.

(5) Further, in the above-described embodiments, it is also possible to generate the signal ZL from the reduced image. This is also what makes the embodiments different from Patent document 2.

Application to Other Color Coordinate Systems

In the present application the signal components of a color image is generally expressed as a luminance signal and color differences. However, in actual color specification systems, various different color coordinate systems are used. The present invention is thus feasible with the signal components assigned the different names.

For example, the luminance signal is replaceable with an achromatic component (signal component assumed to be achromatic information). Also, the color differences are replaceable with a chromatic component (signal component assumed to be chromatic information). Accordingly, the replacement as shown in the following list is also possible.

| representation | | Achromatic component | chromatic component |
|---|---|---|---|
| YCC | Y: Cr, Cb | luminance luma | chrominance chroma |
| Lab | L: a, b | lightness | chroma |
| CIECAM | J: $a_C$, $b_C$ | lightness | chroma |
| | Q: $a_M$, $b_M$ | brightness | colorfulness |
| IPT | I: P, T | lightness | chroma |

In addition, in a CIECAM02 coordinate system, lightness J is usable in place of Y, and chroma ac, bc are usable in place of Cr, Cb. In another expression of the same coordinate system, brightness Q is usable in place of Y, and colorfulness aM, bM are useable in place of Cr, Cb. Also, in IPT color coordinate system, I is usable in place of Y, and P, T are usable in replace of Cr, Cb.

Here, signals Cr, Cb indicating a plurality of color differences can be approximated by using a value C defined in the following equation:

$$C = \sqrt{\sqrt{Cr^2 + Cb^2}}$$

In this case the above-mentioned Z is approximated by the following equation:

$$Z = Y + w3 \cdot |Cr| + w4 \cdot |Cb| \approx Y + w \cdot C$$

The invention is not limited to the above embodiments and various modifications may be made without departing from the spirit and scope of the invention. Any improvement may be made in part or all of the components.

What is claimed is:

1. A tone transformation apparatus transforming a tone of an original image, the apparatus comprising:
   a signal obtaining unit which extracts or generates a first signal Z[i, j] that reflects brightness, or brightness and color difference of a pixel [i, j] of the original image;
   a neighborhood processing unit which extracts or generates a second signal ZL[i, j] that reflects brightness and color difference of a neighborhood area of the pixel [i, j];
   a gain generator which generates an added composite signal Z1=($\beta$·Z +$\alpha$·ZL) of the first signal Z[i, j] and the second signal ZL[i, j], and determines a transformation gain k for the pixel [i, j] by substituting the added composite signal Z1 for Z1 in a function k=k (Z1) of a predetermined gain curve; and
   a tone transformation unit which performs tone transformation by multiplying, by the transformation gain k for said pixel [i, j], a color component of said pixel [i, j] or a signal component generated from the color component.

2. The tone transformation apparatus according to claim 1, wherein
   the function of the predetermined gain curve differs in determining a gain by which an achromatic signal is multiplied and determining a gain by which a chromaticity signal such as a color difference is multiplied.

3. The tone transformation apparatus according to claim 1, wherein
   said gain generator defines, as the added composite signal Z1, a value resulting from weighted composition of the first signal Z[i, j] and the second signal ZL[i, j], or a value resulting from weighted composition of the weighed composition value and higher terms of the first signal Z[i, j] and the second signal ZL[i, j], and determines the transformation gain k for the pixel [i, j] based on the function k=k (Z1) of the predetermined gain curve.

4. The tone transformation apparatus according to claim 1, wherein said gain generator obtains signals X, XL by an arithmetic operation of finding reciprocals of the first and second signals Z, ZL; generates a composite signal X1 by composing the signals X, XL; and finds said transformation gain k according to the composite signal X1.

5. The tone transformation apparatus according to claim 2, wherein said gain generator generates the added composite signal Z1 (Z, ZL) of the first signal Z[i, j] and the second signal ZL[i, j] by an equation Z1=(1−α)·Y +α·V, where 0 <α<1.

6. The tone transformation apparatus according to claim 1, wherein said neighborhood processing unit reduces the original image to generate a reduced image and extracts or generates from the reduced image the second signal ZL[i, j].

7. The tone transformation apparatus according to claim 6, wherein a reduction ratio of the reduced image is ⅛ or lower.

8. The tone transformation apparatus according to claim 6, wherein said neighborhood processing unit executes predetermined filtering in a process of reducing the original image.

9. The tone transformation apparatus according to claim 6, wherein said neighborhood processing unit finds a signal V indicating representative points of every M pixels (M≧2) of the original image to generate the reduced image, and variably magnifies the reduced image M-fold to generate the second signal ZL[i, j] of a size of the original image.

10. An electronic camera comprising:

the tone transformation apparatus according to claim 1, and an image-capturing unit capturing an image of a subject to generate an original image, wherein a tone of the original image generated by said image-capturing unit is transformed by using said tone transformation apparatus.

11. A tone transformation method of transforming a tone of an original image, the method comprising:

extracting or generating a first signal Z[i, j] that reflects brightness, or brightness and color difference of a pixel [i, j] of the original image;

extracting or generating the second signal ZL[i, j] that reflects brightness and color difference of a neighborhood area of the pixel [i, J];

generating an added composite signal Z1=(β·Z+α·ZL) of the first signal Z[i, j] and the second signal ZL[i, j], and determining a transformation gain k for the pixel [i, j] by substituting the added composite signal Z1 for Z1 in a function k=k (Z1) of a predetermined gain curve;

performing tone transformation by multiplying, by said transformation gain k for said pixel [i, j], a color component of said pixel

[i, j] or a signal component generated from the color component; and storing or outputting the transformed tone so as to obtain a new image by applying the transformed tone to the original image, wherein a computer is used to perform the steps.

12. The tone transformation apparatus according to claim 1, wherein the first signal Z[i, j] and the second signal ZL[i, j] is expressed as Y+w1·|Cr|+w2·|Cb|, where Y is a signal dependent on the brightness, |Cr| and |Cb| are signals reflecting the color differences, and w1 and w2 are constants.

13. The tone transformation apparatus according to claim 1, wherein the first signal Z[i, j] is a signal Y reflecting brightness, and the second signal ZL[i, j] is a signal that changes according to a value of said signal Y where a value of color difference multiplied by a constant is added.

14. The tone transformation apparatus according to claim 1, wherein the first signal Z[i, j] and the second signal ZL[i, j] are signals that change according to a value of a signal Y reflecting brightness where a value of color difference multiplied by a constant is added.

15. The tone transformation apparatus according to claim 13, wherein the second signal ZL[i, j] is expressed as Y+w1·|Cr|+ w2·|Cb|, where Y is a signal dependent on the brightness, |Cr| and |Cb| are signals reflecting the color differences, and w1 and w2 are constants.

* * * * *